(12) United States Patent
Sasaki

(10) Patent No.: US 10,411,227 B2
(45) Date of Patent: Sep. 10, 2019

(54) ENERGY STORAGE DEVICE, ENERGY STORAGE APPARATUS AND METHOD OF MANUFACTURING ENERGY STORAGE DEVICE

(71) Applicant: GS Yuasa International Ltd., Kyoto-shi (JP)

(72) Inventor: Takeshi Sasaki, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 0 days.

(21) Appl. No.: 15/609,432

(22) Filed: May 31, 2017

(65) Prior Publication Data

US 2017/0346049 A1 Nov. 30, 2017

(30) Foreign Application Priority Data

May 31, 2016 (JP) .................. 2016-109151

(51) Int. Cl.
*H01M 2/22* (2006.01)
*H01M 2/10* (2006.01)
(Continued)

(52) U.S. Cl.
CPC ............. *H01M 2/10* (2013.01); *B23K 11/002* (2013.01); *B23K 11/185* (2013.01); *B23K 20/10* (2013.01);
(Continued)

(58) Field of Classification Search
CPC ...... H01M 2/10; H01M 2/263; H01M 2/0217; B23K 20/10; B23K 11/185; B23K 11/002;
(Continued)

(56) References Cited

U.S. PATENT DOCUMENTS 5,709,965 A 1/1998 Grivel et al.
2015/0118569 A1* 4/2015 Murakami ............ H01M 2/263
429/245
2016/0204393 A1 7/2016 Harayama et al.

FOREIGN PATENT DOCUMENTS

JP H 08-83598 A 3/1996
JP 2001-307706 A 11/2001
(Continued)

OTHER PUBLICATIONS

Translation of JP 2004-273178, retrived from <https://www4.j-platpat.inpit.go.jp/eng/tokujitsu/tkbs_en/TKBS_EN_GM101_Top.action> on Oct. 2, 2018.*

*Primary Examiner* — Cynthia K Walls
(74) *Attorney, Agent, or Firm* — McGinn IP Law Group, PLLC

(57) ABSTRACT

Provided is an energy storage device which includes: an electrode assembly where electrodes are layered to each other; and current collector joined to the layered electrodes in a state where the current collector overlaps with the electrodes. The electrode and the current collector are welded to each other or are joined to each other by ultrasonic bonding at a first joint portion. At least one of the electrode and the current collector includes a wall surface which projects from a periphery of the first joint portion or a region adjacent to the periphery along a stacking direction of the electrode and the current collector, and surrounds the first joint portion. The wall surface is disposed on both sides of the first joint portion in the stacking direction.

18 Claims, 16 Drawing Sheets

(51) Int. Cl.
*B23K 20/10* (2006.01)
*B23K 11/00* (2006.01)
*B23K 11/18* (2006.01)
*B23K 20/233* (2006.01)
*B23K 26/32* (2014.01)
*B23K 26/21* (2014.01)
*H01M 2/26* (2006.01)
*H01M 2/02* (2006.01)
*B23K 101/36* (2006.01)
*B23K 103/10* (2006.01)

(52) U.S. Cl.
CPC .......... *B23K 20/2336* (2013.01); *B23K 26/21* (2015.10); *B23K 26/32* (2013.01); *H01M 2/263* (2013.01); *B23K 2101/36* (2018.08); *B23K 2103/10* (2018.08); *H01M 2/0217* (2013.01)

(58) Field of Classification Search
CPC .... B23K 20/2336; B23K 26/21; B23K 26/32; B23K 2101/36; B23K 2103/10
See application file for complete search history.

(56) References Cited

FOREIGN PATENT DOCUMENTS

| | | |
|---|---|---|
| JP | 2002-313309 A | 10/2002 |
| JP | 2004-273178 A | 9/2004 |
| JP | 2009-090354 A | 4/2009 |
| JP | 2015-005456 A | 1/2015 |
| JP | 2015-041589 A | 3/2015 |

* cited by examiner

ENERGY STORAGE DEVICE, ENERGY STORAGE APPARATUS AND METHOD OF MANUFACTURING ENERGY STORAGE DEVICE

CROSS-REFERENCE TO RELATED APPLICATIONS

This application claims the benefit of Japanese patent application No. 2016-109151 filed on May 31, 2016 which is incorporated by reference.

FIELD

The present invention relates to an energy storage device, an energy storage apparatus which includes the energy storage device, and a method of manufacturing an energy storage device.

BACKGROUND

As shown in FIG. 19, there has been known a lithium ion secondary battery 800 which includes a winding electrode assembly 801, a positive-electrode current collector terminal 802 and a negative-electrode current collector terminal 803. See JP-A-2015-41589.

The lithium ion secondary battery 800 includes: the winding electrode assembly 801; the positive-electrode current collector terminal 802 and the negative-electrode current collector terminal 803 which are connected to the winding electrode assembly 801; a battery case 804 which houses the winding electrode assembly 801; and an insulation film 805 which is disposed along an inner surface of the battery case 804. The winding electrode assembly 801 is formed by making a positive electrode sheet 808 including a positive active material layer 807 and a negative electrode sheet 810 including a negative active material layer 809 overlap with each other while interposing a separator 806 between the positive electrode sheet 808 and the negative electrode sheet 810, and by winding the positive electrode sheet 808, the negative electrode sheet 810 and the separator 806. The positive-electrode current collector terminal 802 is made of aluminum or an aluminum alloy. A distal end portion of the positive-electrode current collector terminal 802 is welded to a center portion of a positive active material layer non-forming portion 811 of the winding electrode assembly 801. The positive active material layer non-forming portion 811 is a portion of the positive electrode sheet 808 where a portion which is not coated by the positive active material layer 807 (a portion where a metal foil such as an aluminum foil is exposed) is wound. The negative-electrode current collector terminal 803 is a member made of copper or a copper alloy. A distal end portion of the negative-electrode current collector terminal 803 is welded to a center portion of a negative active material layer non-forming portion 812 of the winding electrode assembly 801. The negative active material layer non-forming portion 812 is a portion of the negative electrode sheet 810 where the portion which is not coated by the negative active material layer 809 (a portion where a metal foil such as a copper foil is exposed) is wound.

In such a lithium ion secondary battery 800, the winding electrode assembly 801 and the current collector terminals (the positive-electrode current collector terminal 802, the negative-electrode current collector terminal 803) are joined to each other by welding and hence, there may be a case where metal powder or the like generated due to welding (fine metal powder or the like generated due to joining of the winding electrode assembly 801 and the current collector terminal 802, 803) adheres to a surface of a welding portion (joint portion). In this case, when a member such as the insulation film 805 which is disposed at a position facing the welding portion is brought into contact with the welding portion during the use of the lithium ion secondary battery 800, there may be a case where the metal powder or the like is separated from the surface of the welding portion and moves to other portions.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of this embodiment is to provide an energy storage device where other members are minimally brought into contact with a surface of a joint portion where an electrode assembly and a current collector are joined to each other, an energy storage apparatus which includes the energy storage device, and a method of manufacturing the energy storage device.

An energy storage device according to an aspect of the present invention includes: an electrode assembly where electrodes are layered to each other; and a current collector joined to the layered electrodes in a state where the current collector overlaps with the electrodes. The electrode and the current collector are welded to each other or are joined to each other by ultrasonic bonding at a first joint portion. At least one of the electrode and the current collector includes a wall surface which projects from a periphery of the first joint portion or a region adjacent to the periphery along a stacking direction of the electrode and the current collector, and surrounds the first joint portion. The wall surface is disposed on both sides of the first joint portion in the stacking direction.

A method of manufacturing an energy storage device according to the another aspect of the present invention, includes: joining a current collector and a layered electrode to each other by mechanical clinching in a state where the current collector and the electrode overlap with each other; and performing welding or ultrasonic bonding on a joint portion between the current collector and the electrode formed by mechanical clinching. The joint portion includes a wall surface which projects from a periphery of a joint region where the current collector and the electrode are joined to each other by welding or ultrasonic bonding or a region adjacent to the periphery along a stacking direction of the current collector and the electrode. The wall surface surrounds the joint region, and is formed on both sides of the joint region in the stacking direction.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
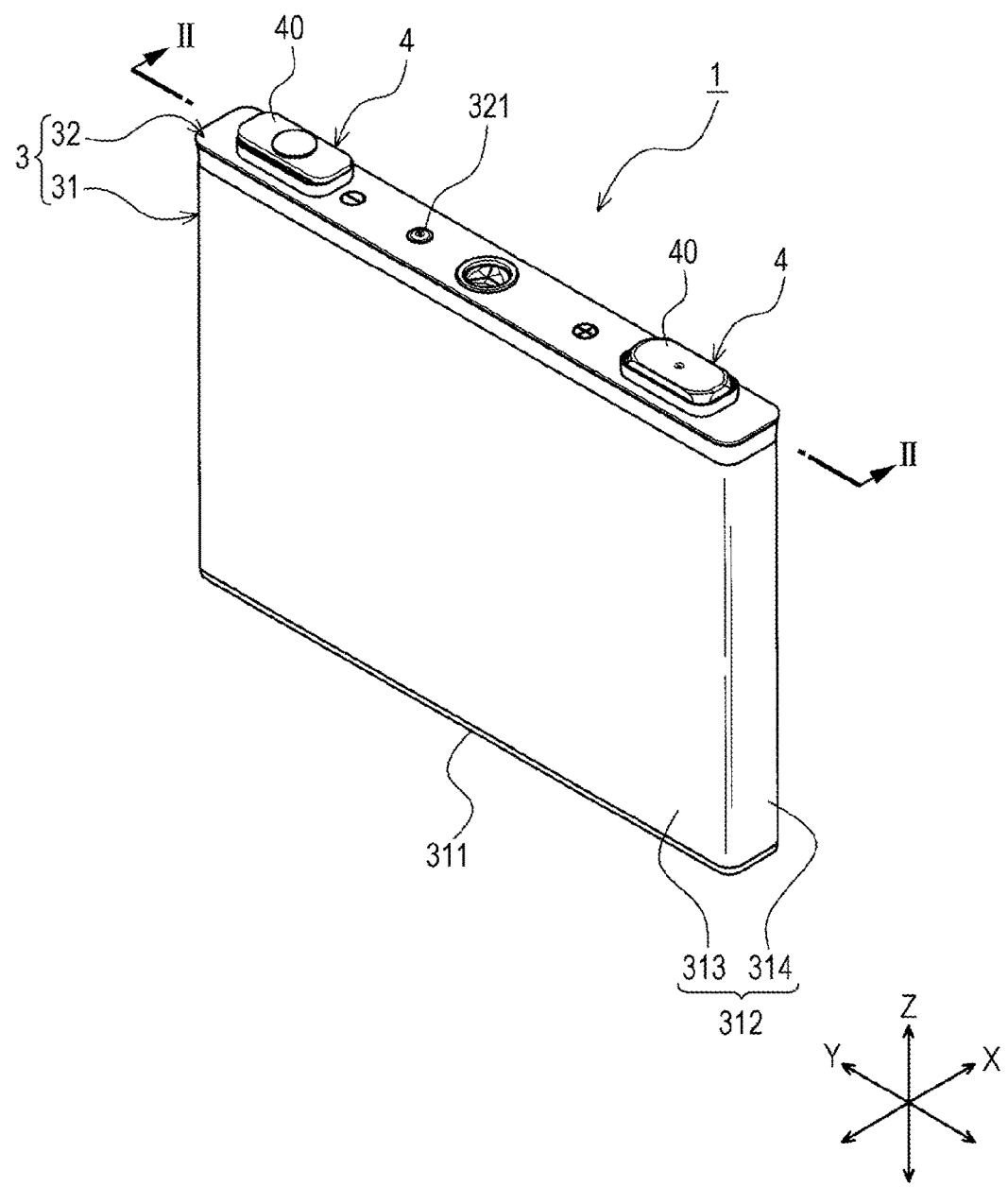
FIG. 1 is a perspective view of an energy storage device according to an embodiment of the present invention.

According to an aspect of the embodiment, there is provided an energy storage device including: an electrode assembly where electrodes are layered to each other; and current collector joined to the layered electrodes in a state where the current collector overlaps with the electrodes. The electrode and the current collector are welded to each other or are joined to each other by ultrasonic bonding at a first joint portion, at least one of the electrode and the current collector includes a wall surface which projects from a periphery of the first joint portion or a region adjacent to the periphery along a stacking direction of the electrode and the current collector, and surrounds the first joint portion. The wall surface is disposed on both sides of the first joint portion in the stacking direction.

With such a configuration, the energy storage device includes, on both sides of the first joint portion, the wall surface which projects from the periphery of the first joint portion or the region adjacent to the periphery along the stacking direction, and surrounds the first joint portion. Accordingly, due to the formation of the wall surfaces (to be more specific, the portions each of which includes the wall surface), other members (members which face the joint portion or the like) are minimally brought into contact with the surface of the joint portion between the electrode and the current collector (to be more specific, the first joint portion).

According to another aspect of the embodiment, the energy storage device may be configured such that the electrode and the current collector include a second joint portion in a region which includes the first joint portion. The second joint portion may join the electrode and the current collector to each other and may form a projecting portion on one side in the stacking direction and a recessed portion on the other side in the stacking direction. The first joint portion may be continuously formed from a distal end surface of the projecting portion to a bottom surface of the recessed portion, and the distal end surface of the projecting portion may include an annular projecting portion which surrounds the first joint portion. An inner peripheral surface of the annular projecting portion may form the wall surface on one side of the first joint portion in the stacking direction, and an inner peripheral surface of the recessed portion may form the wall surface on the other side of the first joint portion in the stacking direction.

By forming the first joint portion and the second joint portion in an overlapping manner as described above, joining between the electrode and the current collector at the portion is further strengthened.

According to still another aspect of the embodiment, there is provided an energy storage apparatus which includes at least one energy storage device having the above-mentioned configuration.

With such a configuration, at least one energy storage device includes, on both sides of a first joint portion, a wall surface which projects from a periphery of the first joint portion or a region adjacent to the periphery along a stacking direction, and surrounds the first joint portion. Accordingly, due to the formation of the wall surfaces (to be more specific, portions each of which includes the wall surface), other members (members which face the joint portion or the like) are minimally brought into contact with a surface of the joint portion between the electrode and the current collector (to be more specific, the first joint portion).

According to still another aspect of the embodiment, there is provided a method of manufacturing an energy storage device includes: joining a current collector and a layered electrode to each other by mechanical clinching in a state where the current collector and the electrode overlap with each other; and performing welding or ultrasonic bonding on a joint portion between the current collector and the electrode formed by mechanical clinching. The joint portion includes a wall surface which projects from a periphery of a joint region where the current collector and the electrode are joined to each other by welding or ultrasonic bonding or a region adjacent to the periphery along a stacking direction of the current collector and the electrode. The wall surface surrounds the joint region, and is formed on both sides of the joint region in the stacking direction.

With such a configuration, on both sides of the joint region, the wall surface which projects from the periphery of the joint region or the region adjacent to the periphery along the stacking direction, and surrounds the joint region is formed. Accordingly, in the manufactured energy storage device, due to the formation of the wall surface (to be more specific, portions each of which includes the wall surface), other members (members which face the joint portion or the like) are minimally brought into contact with a surface of the joint region.

Further, even when metal powder or the like (fine metal powder or the like generated due to joining) is likely to scatter from the surface of a welded portion or a surface of a ultrasonic bonded portion at the time of performing welding or ultrasonic bonding, such scattering is suppressed by the wall surface formed by mechanical clinching. Accordingly, the adhesion or the like of metal powder or the like to other members due to such scattering can be prevented.

The portion which is joined by mechanical clinching is further joined by welding or ultrasonic bonding and hence, the electrodes are more firmly joined to each other. At the same time, the electrodes and the current collector are more firmly joined to each other. Accordingly, the increase of resistance at the joint portion between the electrode and the current collector, peeling-off of the joint portion and the like can be suppressed with more certainty.

In the method of manufacturing an energy storage device, the joint portion may be configured such that a projecting portion is formed on one side of the joint portion in the stacking direction and a recessed portion is formed on the other side of the joint portion in the stacking direction. A distal end surface of the projecting portion may include the joint region and an annular projecting portion which surrounds the joint region, and a bottom surface of the recessed portion includes the joint region. An inner peripheral surface of the annular projecting portion may form the wall surface on one side of the joint portion in the stacking direction. An inner peripheral surface of the recessed portion may form the wall surface on the other side of the joint portion in the stacking direction. The welding or the ultrasonic bonding may be performed in a state where the joint portion is clamped by a first jig and a second jig such that the first jig is in contact with the distal end surface of the projecting portion and the second jig is in contact with the bottom surface of the recessed portion. A contact area between the first jig and the distal end surface may be set equal to or smaller than a contact area between the second jig and the bottom surface.

With such a configuration, an area of the distal end surface of the first jig is set equal to or smaller than an area of the distal end surface of the second jig which is inserted into the recessed portion and is in contact with the bottom surface. Accordingly, when the joint portion is clamped between the first jig and the second jig in performing welding or ultrasonic bonding, the annular projecting portion (wall surface on one side) is not collapsed by the first jig.

As has been described above, according to this embodiment, it is possible to provide an energy storage device where other members are minimally brought into contact with a surface of the joint portion where the electrode assembly and the current collector are joined to each other, an energy storage apparatus which includes the energy storage device, and a method of manufacturing an energy storage device.

Hereinafter, one embodiment of the present invention is described with reference to FIG. 1 to FIG. 15. Names of respective constitutional members (respective constitutional elements) used in this embodiment are exclusively for this embodiment, and may differ from names of respective constitutional members (respective constitutional elements) used in BACKGROUND.

First, an energy storage device is described. An energy storage device may be a primary battery, a secondary battery, a capacitor or the like. In this embodiment, as one example of the energy storage device, a chargeable/dischargeable secondary battery is described.

The energy storage device is a nonaqueous electrolyte secondary battery. To be more specific, the energy storage device is a lithium ion secondary battery which makes use of the electron movement generated along with the movement of lithium ions. The energy storage device of this type supplies electrical energy. The energy storage device is used singularly or in plural. When a required output and a required voltage are small, the energy storage device is used singularly. When at least either one of a required output or a required voltage is large, the energy storage device is used to form an energy storage apparatus in combination with other energy storage devices. In the energy storage apparatus, the energy storage device(s) used in the energy storage apparatus supplies electrical energy.

As shown in FIG. 1 to FIG. 4, the energy storage device includes: an electrode assembly 2 where electrodes 23, 24 are layered to each other; and current collectors 5 joined to the layered electrodes 23, 24 in a state where the current collectors 5 are made to overlap with the electrodes 23, 24. In this embodiment, the electrodes include a positive electrode 23 and a negative electrode 24. The energy storage device 1 includes wall surfaces 616, 653 which project from a periphery of a first joint portion 606 between the electrode 23, 24 and the current collector 5 (see FIG. 10) or a region adjacent to the periphery along a stacking direction of the electrodes 23, 24 and the current collector 5, and surround the first joint portion 606. The energy storage device 1 of this embodiment includes the wall surfaces 616, 653 on both sides of the first joint portion 606 respectively. The energy storage device 1 also includes: a case 3 which houses the electrode assembly 2 therein; and external terminals 4 which are disposed outside the case 3, and are electrically conductive to the electrode assembly 2 through the current collectors 5. The energy storage device 1 of this embodiment further includes an insulating member 7 and the like which provides insulation between the electrode assembly 2 and the case 3. The detailed configuration is described hereinafter.

The electrode assembly 2 includes: a winding core 21; and a layered body 22. The layered body 22 is formed such that the positive electrode 23 and the negative electrode 24 are layered to each other in a state where the positive electrode 23 and the negative electrode 24 are insulated from each other, and the layered body is wound around the winding core 21 (see FIG. 2 and FIG. 4). In this electrode assembly 2, lithium ions move between the positive electrode 23 and the negative electrode 24 so that the energy storage device 1 charges/discharges electricity.

The winding core 21 is made of an insulating material. In this embodiment, the winding core 21 has a flat cylindrical shape, and is formed by winding a sheet having flexibility or thermoplasticity. The layered body 22 is formed by winding the positive electrode 23 and the negative electrode 24 around the winding core 21 in a state where the positive electrode 23 and the negative electrode 24 are layered to each other (made to overlap with each other).

The positive electrode 23 includes: a metal foil; and a positive active material layer formed on the metal foil. The metal foil has a strip shape. In this embodiment, the metal foil is an aluminum foil, for example. The positive electrode 23 includes a non-coated portion 231 which is not coated by the positive active material layer (a portion where the positive active material layer is not formed) at one end edge portion thereof in the short-length direction (width direction)

of the strip shape. The positive electrode 23 also includes a coated portion 232 where the positive active material layer is layered to the metal foil.

The negative electrode 24 includes: a metal foil; and a negative active material layer formed on the metal foil. The metal foil has a strip shape. In this embodiment, the metal foil is a copper foil, for example. The negative electrode 24 includes a non-coated portion 241 which is not coated by the negative active material layer (a portion where the negative active material layer is not formed) at the other end edge portion thereof (on a side opposite to the non-coated portion 231 of the positive electrode 23) in the short-length direction (width direction) of the strip shape. The negative electrode 24 also includes a coated portion 242 where the negative active material layer is layered to the metal foil. A width of the coated portion 242 of the negative electrode 24 is larger than a width of the coated portion 232 of the positive electrode 23.

In this embodiment, in the electrode assembly 2, the positive electrode 23 and the negative electrode 24 having the above-mentioned constitution are wound in a state where the positive electrode 23 and the negative electrode 24 are insulated from each other by separators 25 having a strip shape. That is, in this embodiment, the electrode assembly 2 is formed by winding the layered body 22 formed of the positive electrode 23, the negative electrode 24, and the separators 25. The separators 25 are members having an insulating property. Each separator 25 is disposed between the positive electrode 23 and the negative electrode 24. The separators 25 are disposed as described above so that the positive electrode 23 and the negative electrode 24 are insulated from each other in the electrode assembly 2 (to be more specific, in the layered body 22). The separator 25 is formed of a porous membrane, and retains an electrolyte solution in the case 3. With such a configuration, at the time of charging or discharging the energy storage device 1, lithium ions are movable between the positive electrode 23 and the negative electrode 24 which are alternately layered to each other with the separator 25 interposed therebetween.

A width of the separator (a size of the strip shape in the short-length direction) is slightly larger than a width of the coated portion 242 of the negative electrode 24. The separator 25 is disposed between the positive electrode 23 and the negative electrode 24 which overlap with each other in a displaced manner in the width direction such that the coated portions 232, 242 overlap with each other. In such a state, the non-coated portion 231 of the positive electrode 23 and the non-coated portion 241 of the negative electrode 24 do not overlap with each other. That is, the non-coated portion 231 of the positive electrode 23 projects in the width direction from a region where the positive electrode 23 and the negative electrode 24 overlap with each other. The non-coated portion 241 of the negative electrode 24 projects in the width direction (the direction opposite to the projecting direction of the non-coated portion 231 of the positive electrode 23) from the region where the positive electrode 23 and the negative electrode 24 overlap with each other. A non-coated layered portion 26 of the electrode assembly 2 is formed of a portion where only the non-coated portion 231 of the positive electrode 23 is layered or a portion where only the non-coated portion 241 of the negative electrode 24 is layered.

The non-coated layered portions 26 are portions of the electrode assembly 2 which are electrically connected to the current collectors 5. In this embodiment, as viewed in the winding axis direction of the wound positive electrode 23, negative electrode 24 and separators 25, each non-coated layered portion 26 is divided into two portions (two divided non-coated layered portions) 261 with a hollow portion 27 (a region surrounded by the layered body 22) interposed therebetween (see FIG. 4).

The non-coated layered portion 26 having the above-mentioned configuration is disposed on each electrode of the electrode assembly 2. That is, a portion where only the non-coated portion 231 of the positive electrode 23 is layered form the non-coated layered portion 26 of a positive electrode of the electrode assembly 2, and a portion where only the non-coated portion 241 of the negative electrode 24 is layered form the non-coated layered portion 26 of a negative electrode of the electrode assembly 2.

The case 3 includes: a case body 31 having an opening; and a lid plate 32 which closes (seals) the opening of the case body 31.

The case 3 is formed by joining an opening peripheral edge portion 34 of the case body 31 (see FIG. 3) and a peripheral edge portion of the lid plate 32 to each other in an overlapping state. The case 3 has an inner space 33 defined by the case body 31 and the lid plate 32 (see FIG. 2). The case 3 stores an electrolyte solution in the inner space 33 together with the electrode assembly 2, the current collectors 5 and the like. Accordingly, the case 3 is made of metal having resistance against the electrolyte solution. In this embodiment, in the case 3, the opening peripheral edge portion 34 of the case body 31 and the peripheral edge portion of the lid plate 32 are joined to each other by welding.

The case body 31 includes: a plate-like closed portion 311; and a cylindrical barrel portion 312 connected to a peripheral edge of the closed portion 311.

The closed portion 311 is positioned at a lower end of the case body 31 when the case body 31 is disposed with the opening directed upward. That is, the closed portion 311 is a portion which forms a bottom wall of the case body 31 when the case body 31 is disposed with the opening directed upward. The closed portion 311 has a plate shape having a rectangular profile. In the description made hereinafter, assume the short side direction of the closed portion 311 as the X axis direction in an orthogonal coordinate system, the long side direction of the closed portion 311 as the Y axis direction in the orthogonal coordinate system, and the normal direction of the closed portion 311 as the Z axis direction in the orthogonal coordinate system. Orthogonal coordinate axes which respectively correspond to the X axis direction, the Y axis direction and the Z axis direction are described auxiliarily in the respective drawings.

The barrel portion 312 has a prismatic cylindrical shape which conforms to a profile of the closed portion 311 and, in more detail, the barrel portion 312 has a flat prismatic cylindrical shape. The barrel portion 312 includes: a pair of long wall portions 313 extending from long sides of the peripheral edge of the closed portion 311; and a pair of short wall portions 314 extending from short sides of the peripheral edge of the closed portion 311. One end of the barrel portion 312 is closed by the closed portion 311, and the other end of the barrel portion 312 is opened. That is, the case body 31 has a flat bottomed prismatic cylindrical shape.

The lid plate 32 is a plate-like member which closes the opening of the case body 31. To be more specific, the lid plate 32 has a profile which corresponds to the opening peripheral edge portion 34 of the case body 310 as viewed in the normal direction (Z axis direction). In this embodiment, the pair of external terminals 4 is mounted on the lid plate 32 in a state where the external terminals 4 are electrically connected (conductive) to the respective electrodes (the positive electrode and the negative electrode) of the electrode assembly 2. In this embodiment, the lid plate 32 has a solution filling hole 320 and a solution filling plug 321 which seals the solution filling hole 320 (see FIG. 1 to FIG. 3).

The external terminals 4 are portions which are electrically connected to external terminals of other energy storage devices, external equipment or the like. The external terminals 4 are made of a material having conductivity. The external terminal 4 which forms a positive electrode terminal of the energy storage device 1 is made of a metal material having high weldability such as aluminum or an aluminum-based metal material such as an aluminum alloy. The external terminal 4 which forms a negative electrode terminal of the energy storage device 1 is made of a metal material having high weldability such as copper or a copper-based metal material such as a copper alloy. Each external terminal 4 has a surface 40 to which a bus bar or the like can be welded.

The current collectors 5 are disposed in the case 3, and are directly or indirectly connected to the electrode assembly 2 in an electrically conductive manner. In this embodiment, each current collector 5 is made electrically conductive to the electrode assembly 2 by way of clip members 50. That is, the energy storage device 1 includes the clip members 50 which make the electrode assembly 2 and the current collectors 5 electrically conductive to each other.

Figure 2:
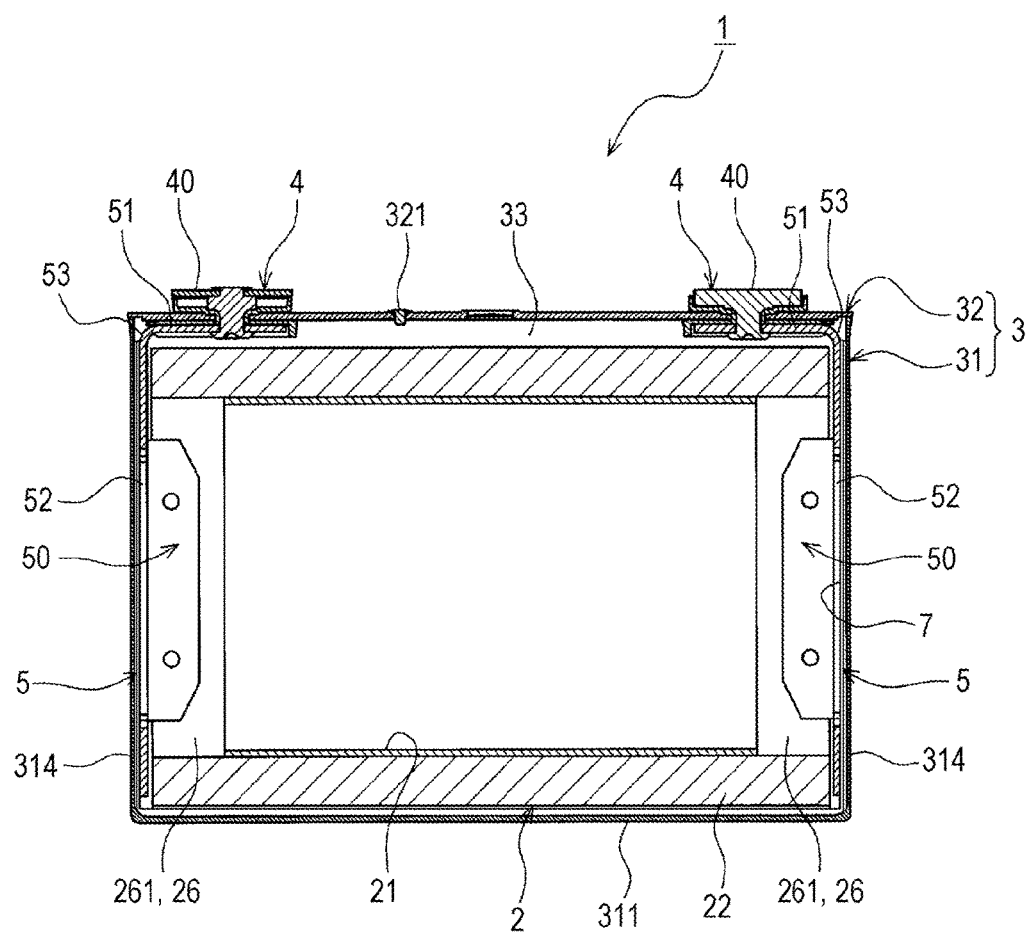
FIG. 2 is a cross-sectional view of the energy storage device taken along line II-II in FIG. 1.
Figure 3:
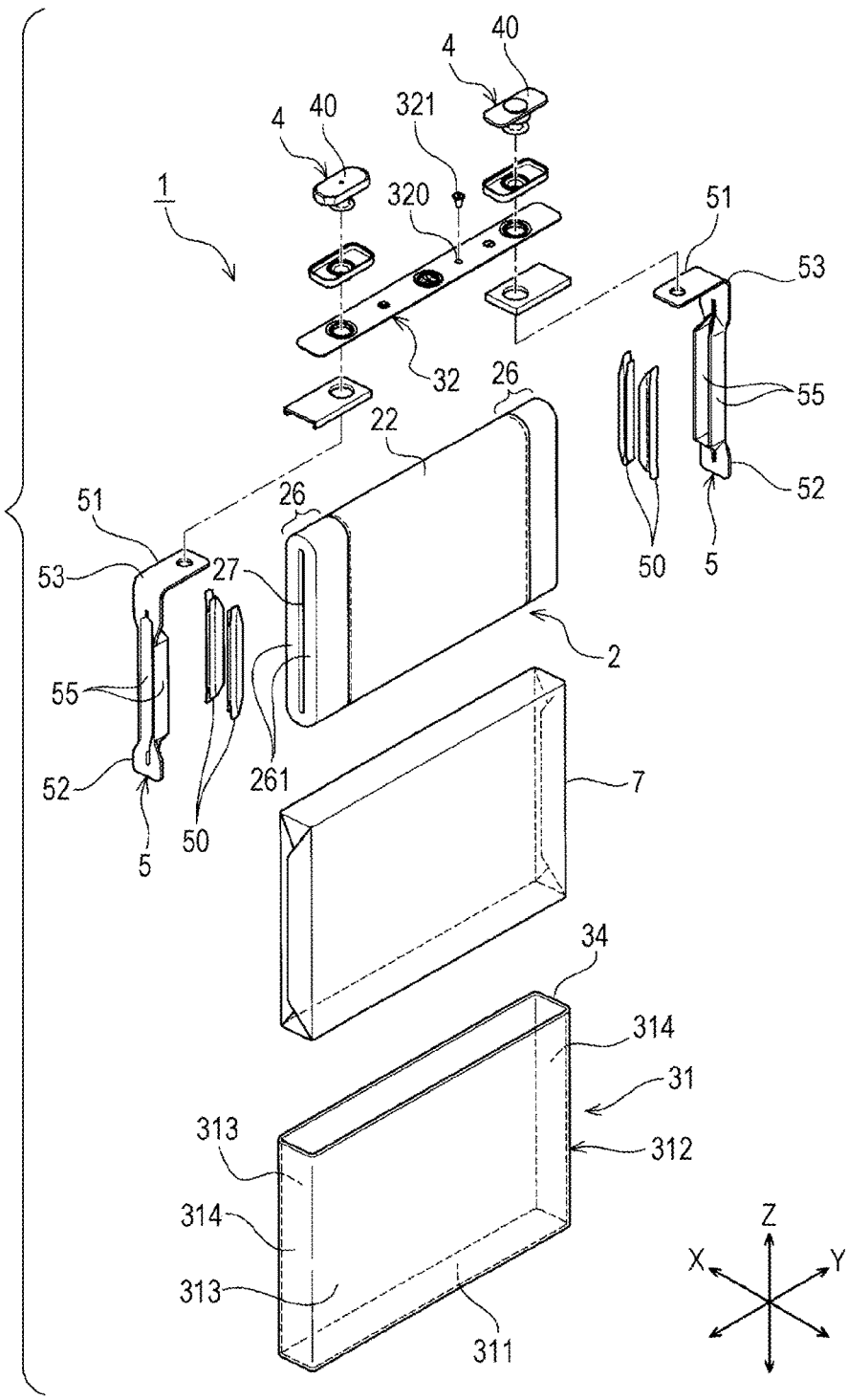
FIG. 3 is an exploded perspective view of the energy storage device.
Figure 4:
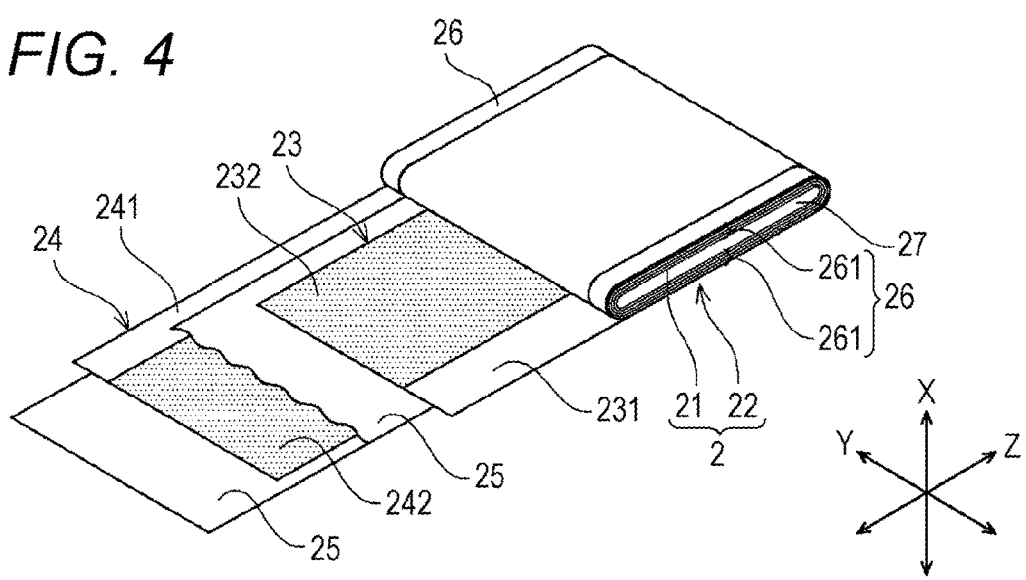
FIG. 4 is a view for describing an electrode assembly, electrodes, and separators of the energy storage device.
Figure 5:
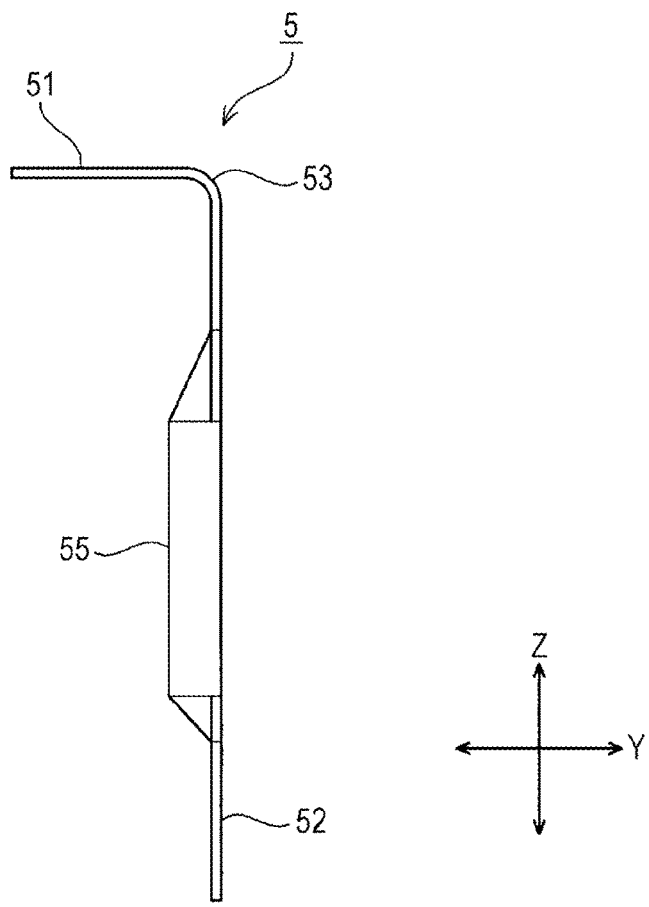
FIG. 5 is a view of a current collector of the energy storage device as viewed in an X axis direction.
Figure 6:
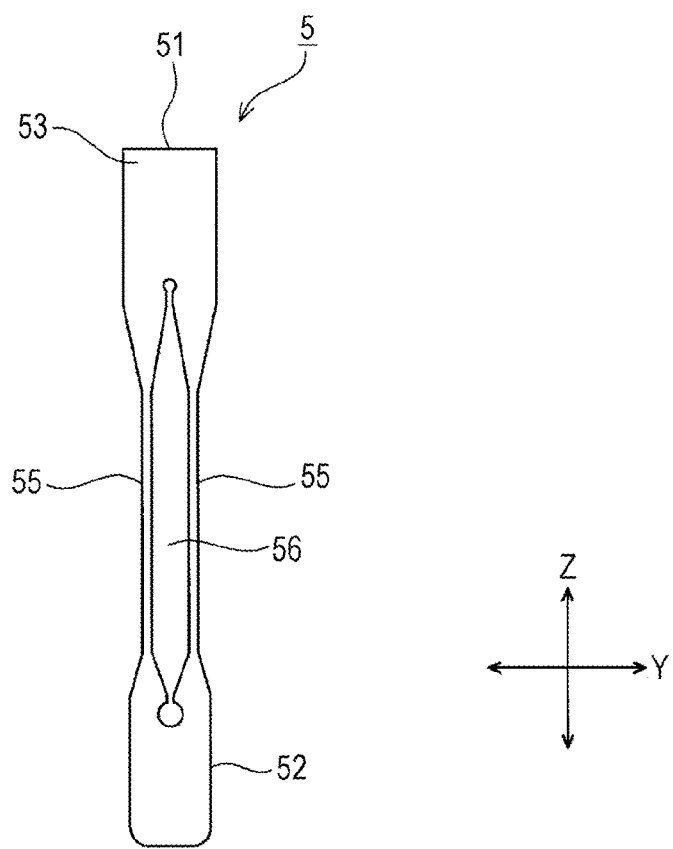
FIG. 6 is a view of the current collector as viewed in a Y axis direction.

The current collector 5 is made of a material having conductivity. As shown in FIG. 2, each current collector 5 is disposed along an inner surface of the case 3. In this embodiment, the current collector 5 makes the external terminal 4 and the clip members 50 electrically conductive to each other. To be more specific, as also shown in FIG. 3, FIG. 5, and FIG. 6, each current collector 5 has: a first connecting portion 51 connected to the external terminal 4 in an electrically conductive manner; a second connecting portion 52 connected to the electrode assembly 2 (clip members 50) in an electrically conductive manner; and a bent portion 53 connecting the first connecting portion 51 and the second connecting portion 52 with each other. In the current collector 5, the bent portion 53 is disposed in the vicinity of a boundary between the lid plate 32 and the short wall portion 314 in the case 3, the first connecting portion 51 extends from the bent portion 53 along the lid plate 32, and the second connecting portion 52 extends from the bent portion 53 along the short wall portion 314 (see FIG. 2). That is, the current collector 5 has an L shape as viewed in the X axis direction (see FIG. 2 and FIG. 5). In this embodiment, the current collector 5 is formed by bending a plate-like metal material which is cut into a predetermined shape. The current collectors 5 shown in FIG. 3, FIG. 5, and FIG. 6 are in a state before the current collectors 5 are joined to the electrode assembly 2 (clip members 50).

The first connecting portion 51 is a plate-like portion which extends from the bent portion 53 along an inner surface of the case 3 (lid plate 32) in a state where the first connecting portion 51 is insulated from the case 3 (to be more specific, the lid plate 32). The external terminal 4 is connected to a distal end portion of the first connecting portion 51.

The second connecting portion 52 is connected to the electrode assembly 2 (in this embodiment, to the non-coated layered portion 26 of the electrode assembly 2 by way of the clip members 50) in an electrically conductive manner. To be more specific, the second connecting portion 52 extends from the bent portion 53 along the inner surface of the case 3 (short wall portion 314) in a state where the second connecting portion 52 is insulated from the case 3. The second connecting portion 52 includes at least one joint piece 55 which extends from an area in the vicinity of the short wall portion 314 toward the non-coated layered portion 26, and also extends in the same direction as the second connecting portion 52. The joint piece 55 is a plate-like portion of the current collector 5 joined to the clip members 50.

In this embodiment, the second connecting portion 52 has two joint pieces 55, 55. To be more specific, an opening 56 is formed in a center portion of the second connecting portion 52 in the X axis direction, and the second connecting portion 52 has two joint pieces 55 extending in the Z axis direction on both sides of the opening 56 so as to define the opening 56. That is, the second connecting portion 52 has: the joint piece 55 which is to be joined to the clip member 50 which clamps one of two divided non-coated layered portions 261 of each non-coated layered portion 26; and a joint piece 55 which is to be joined to the clip member 50 which clamps the other of two divided non-coated layered portions 261 of each non-coated layered portion 26. For example, the opening 56 and two joint pieces 55 are formed such that a cut extending in the Z axis direction (long-length direction) is formed in a strip shaped plate before the second connecting portion 52 is formed, and portions of the strip on both sides of the cut are twisted.

The current collectors 5 having the above-mentioned configuration are disposed on a positive electrode and a negative electrode of the energy storage device 1 respectively. In the energy storage device 1 of this embodiment, one current collector 5 is disposed in the case 3 at a position where one current collector 5 is brought into contact with the non-coated layered portion 26 of the positive electrode of the electrode assembly 2 and the other current collector 5 is disposed in the case 3 at a position where the other current collector 5 is brought into contact with the non-coated layered portion 26 of the negative electrode of the electrode assembly 2.

The current collector 5 for the positive electrode and the current collector 5 for the negative electrode are made of different materials. To be more specific, the current collector 5 for the positive electrode is made of aluminum or an aluminum alloy, for example. The current collector 5 for the negative electrode is made of copper or a copper alloy, for example.

Figure 7:
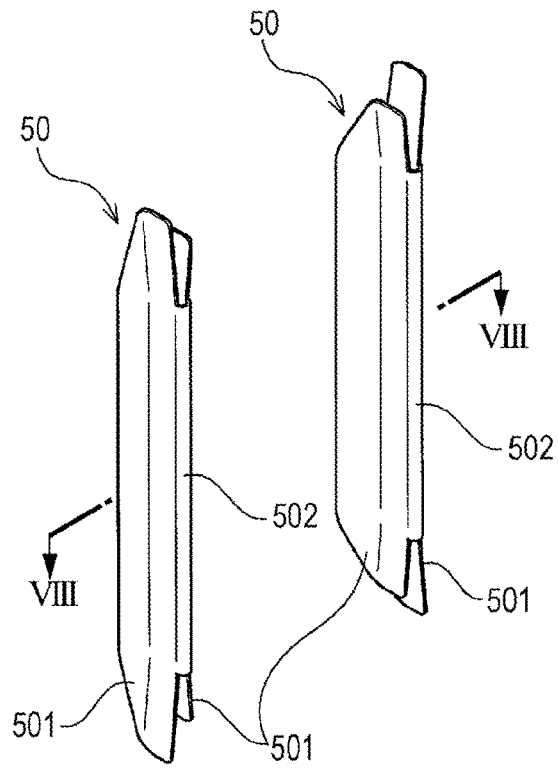
FIG. 7 is a perspective view of clip members of the energy storage device.
Figure 8:
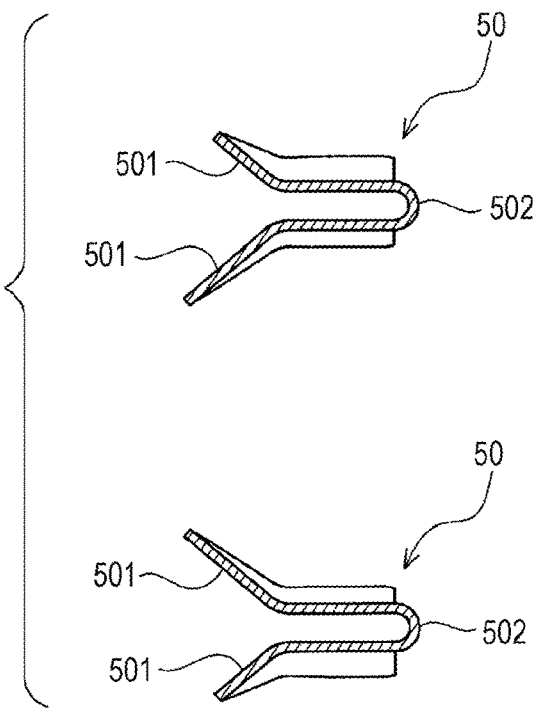
FIG. 8 is a cross-sectional view of the clip members taken along line VIII-VIII in FIG. 7.

Each clip member 50 clamps the layered positive electrodes 23 or the layered negative electrodes 24 at the non-coated layered portion 26 of the electrode assembly 2 (to be more specific, one of two divided non-coated layered portions 261) in a bundle. With such a configuration, the clip member 50 makes the positive electrodes 23 or the negative electrodes 24 which are layered to each other at the non-coated layered portion 26 electrically conductive to each other. To be more specific, as shown in FIG. 2, FIG. 3, FIG. 7, and FIG. 8, the clip member 50 includes: a pair of facing pieces 501 which face each other with one of two divided non-coated layered portions 261 of the non-coated layered portion 26 (the layered positive electrode 23 or the layered negative electrode 24) interposed therebetween; and a connecting portion 502 which connects corresponding one end portions of the pair of facing pieces 501 with each other. The clip member 50 is made of a material having conductivity. In this embodiment, the clip member 50 is formed by bending a plate-like metal material into a U shape in cross section. In this embodiment, two clip members 50 are disposed on the positive electrode of the electrode assembly 2, and two clip members 50 are disposed on the negative electrode of the electrode assembly 2. The clip members 50 shown in FIG. 3, FIG. 7, and FIG. 8 are in a state before the clip members 50 are joined to the current collector 5.

The current collector 5 and the clip members 50 having the above-mentioned configuration (to be more specific, the joint pieces 55 and the clip members 50 in a state where the clip members 50 clamp the non-coated layered portion 26) are joined to each other by mechanical clinching (compression bonding) and resistance welding. To be more specific, a joint portion (joint structure portion) where the current collector 5 and the clip members 50 are joined to each other has the following configuration.

Figure 9:
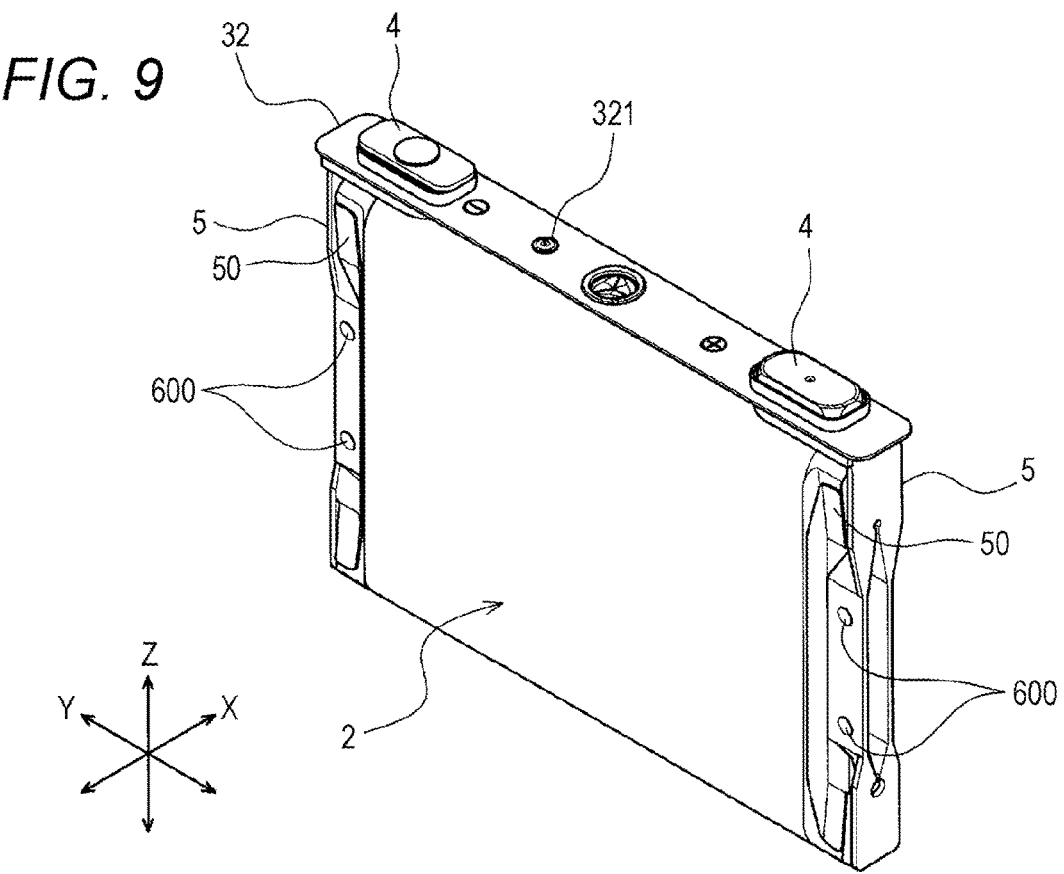
FIG. 9 is a perspective view in a state where external terminals, the electrode assembly, the current collectors and the like are assembled to a lid plate.
Figure 10:
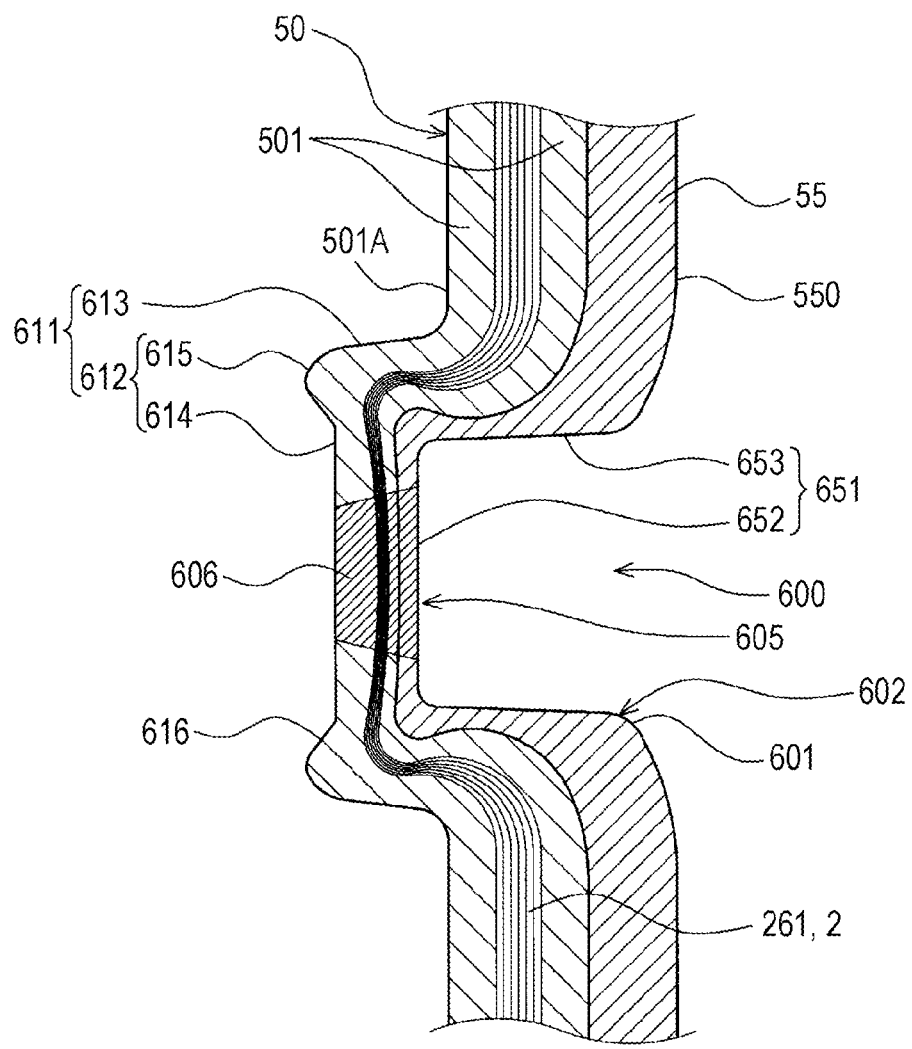
FIG. 10 is a cross-sectional view of a joint structure portion where the electrode and the current collector are joined to each other.

As shown in FIG. 9 and FIG. 10, each joint structure portion 600 is a portion defined by: a recessed portion 651 which is recessed in the direction toward the clip member 50 on a surface 550 of the joint piece 55; and a projecting portion 611 which projects in the direction away from the joint piece 55 on a surface 501A of one facing piece 501 of the clip member 50 at a position which corresponds to the recessed portion 651 (at a position where the projecting portion 611 overlaps with the recessed portion 651 in the X axis direction). In this embodiment, the surface 550 of the joint piece 55 is a surface of the joint piece 55 on a side where the joint piece 55 is not brought into contact with the clip member 50. The surface 501A of one facing piece 501 is a surface of the facing piece 501 of the clip member 50 disposed on a side where the clip member 50 is not brought into contact with the joint piece 55, and is directed to a side opposite to the joint piece 55. In the energy storage device 1 of this embodiment, each joint piece 55 has a plurality of (two in an example of this embodiment: see FIG. 9) joint structure portions 600. The joint piece 55 does not necessarily have the plurality of joint structure portions 600. The joint piece 55 may have one joint structure portion 600.

The recessed portion 651 has a bottom surface 652 expanding in the Y-Z plane direction, and a cylindrical inner peripheral surface (wall surface) 653 connected to a peripheral edge of the bottom surface 652 and extending in the direction that the bottom surface 652 is directed (that is, the inner peripheral surface 653 is raised from the peripheral edge of the bottom surface 652 in the direction that the bottom surface 652 faces). In this embodiment, the bottom surface 652 has an approximately circular shape, and the inner peripheral surface 653 has an approximately circular cylindrical shape.

The projecting portion 611 includes a distal end surface 612 expanding in the Y-Z plane direction, and an outer peripheral surface 613 connected to a peripheral edge of the distal end surface 612 and extending in the direction opposite to the direction that the distal end surface 612 is directed.

The distal end surface 612 includes a center portion 614 expanding in the Y-Z plane direction, and an annular projecting portion 615 surrounding the center portion 614. The annular projecting portion 615 includes, as viewed in cross section (see FIG. 10), an inner peripheral surface (wall surface) 616 which extends from a peripheral edge of the center portion 614 in the projecting direction of the projecting portion 611 or in the direction inclined with respect to the projecting direction of the projecting portion 611.

In this embodiment, the joint structure portion 600 is formed of a portion (second joint portion) 605 having the above-mentioned approximately cylindrical bottomed shape which is formed by mechanical clinching; and a first joint portion (joint region) 606 which is formed by resistance welding and is continuously formed from the distal end surface 612 of the projecting portion 611 (to be more specific, the center portion 614) to the bottom surface 652 of the recessed portion 651. The second joint portion 605 is formed in a region which includes the first joint portion 606. A size (a size along the Y-Z plane direction) of the first joint portion 606 at a position of the distal end surface 612 of the projecting portion 611 is set equal to or smaller than a size of the first joint portion 606 at a position of the bottom surface 652 of the recessed portion 651. In this embodiment, a size of the first joint portion 606 at a position of the distal end surface 612 is set smaller than a size of the first joint portion 606 at a position of the bottom surface 652.

As shown in FIG. 3, the insulating member 7 has a bag shape, for example. As shown in FIG. 2, the insulating member 7 is disposed between the case 3 (to be more specific, the case body 31) and the electrode assembly 2. The insulating member 7 is made of a material having an insulating property. In this embodiment, the bag-shaped insulating member 7 is formed by bending a sheet like member having an insulating property which is cut into a predetermined shape. In this embodiment, the insulating member 7 is made of a resin such as polypropylene or polyphenylene sulfide, for example. In the energy storage device 1 of this embodiment, the electrode assembly 2 (to be more specific, the electrode assembly 2 and the current collectors 5) accommodated in the bag-shaped insulating member 7 is accommodated in the case 3.

Figure 11:
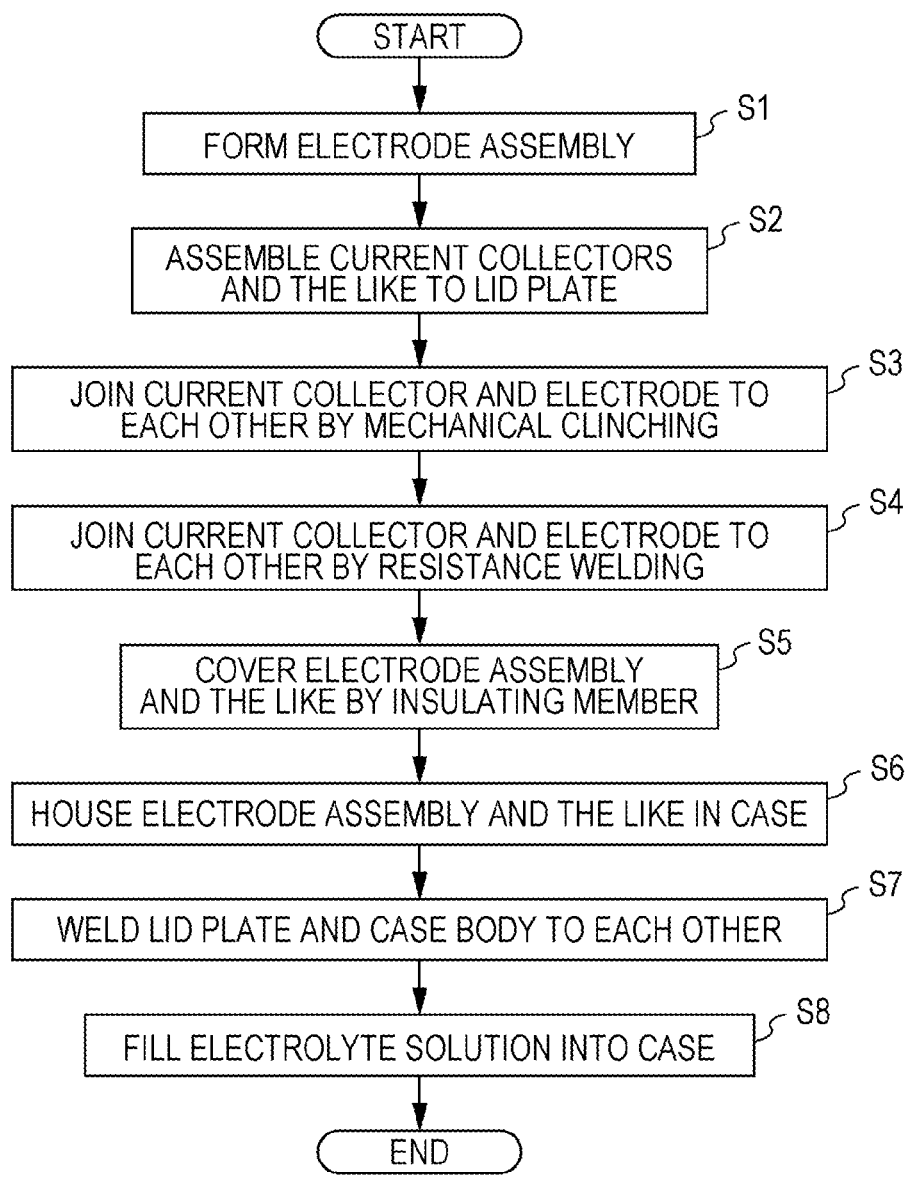
FIG. 11 is a flowchart showing a method of manufacturing an energy storage device.

The energy storage device 1 having the above-mentioned configuration is manufactured in accordance with steps described below (FIG. 11).

The positive electrode 23 and the negative electrode 24 are wound around the winding core 21 in a state where the positive electrode 23 and the negative electrode 24 are layered to each other with the separator 25 interposed therebetween. The electrode assembly 2 is formed in this manner (step S1).

Next, the external terminals 4, the current collectors 5 and the like are assembled to the lid plate 32 (step S2). After the current collectors 5 and the like are assembled to the lid plate 32, subsequently, the current collectors 5 and the electrode assembly 2 are joined to each other in an electrically conductive manner by mechanical clinching and resistance welding. To be more specific, the current collectors 5 and the electrode assembly 2 are joined to each other as described below.

Figure 12:
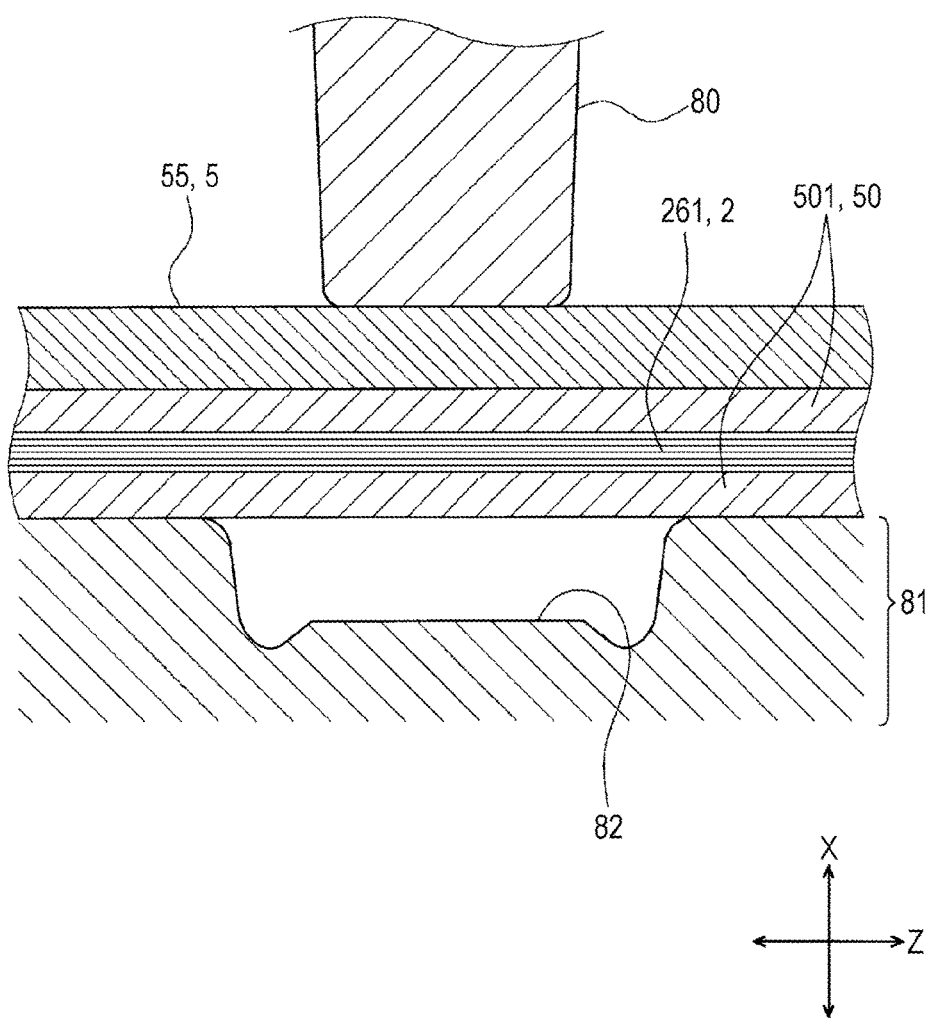
FIG. 12 is a view for describing joining between the electrode assembly and the current collector by mechanical clinching, and is also a view showing a state before a portion to be joined is pressed into a recessed portion of a die.
Figure 13:
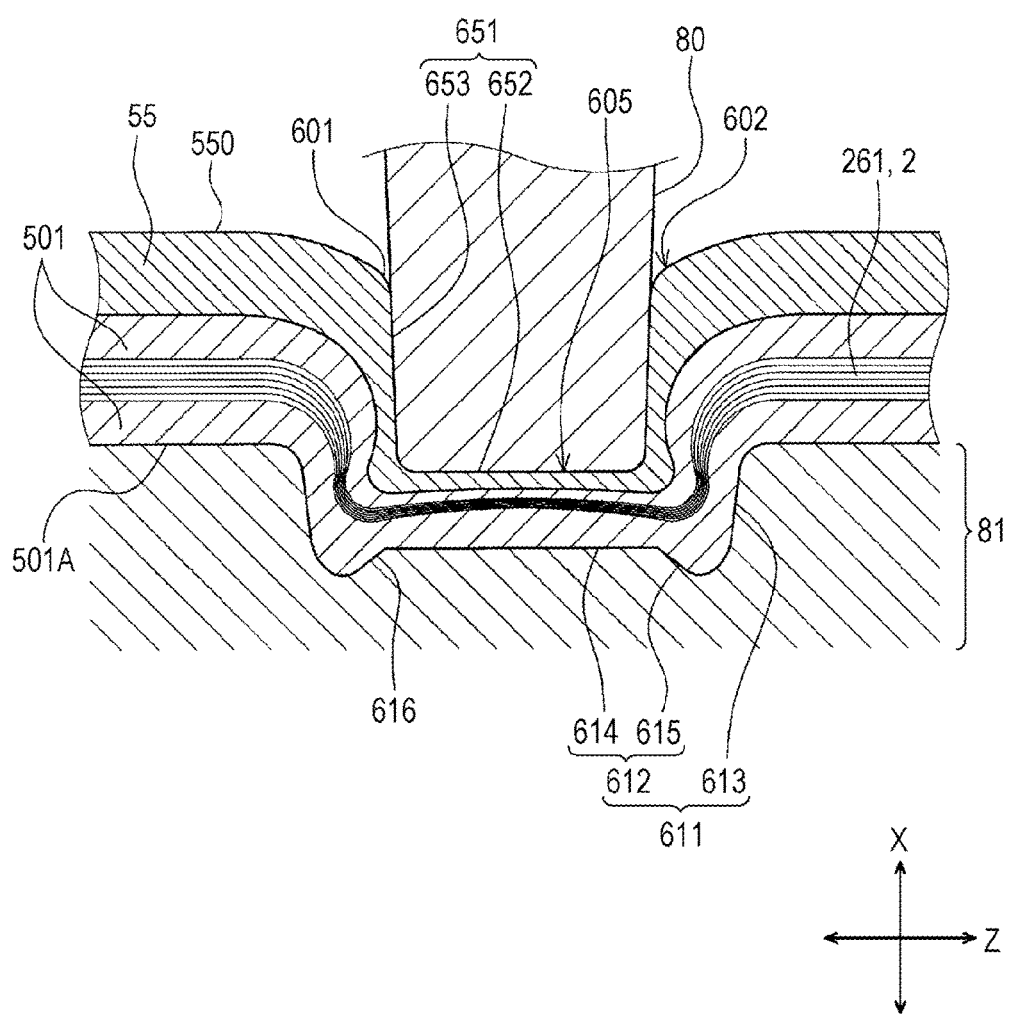
FIG. 13 is a view for describing joining between the electrode assembly and the current collector by mechanical clinching, and is also a view showing a state after the portion to be joined is pressed into the recessed portion of the die by a punch.

Each of two divided non-coated layered portions 261 of the electrode assembly 2 is clamped by the clip member 50. Then, as shown in FIG. 12, the clip members 50 in a state where each clip member 50 clamps one of two divided non-coated layered portions 261 are made to overlap with the current collector 5 (to be more specific, the joint piece 55 of the current collector 5). In such a state, the current collector 5 and the clip member 50 are joined to each other by mechanical clinching (step S3). The joining by mechanical clinching (so-called clinch joining) is performed as follows. As shown in FIG. 12 and FIG. 13, a portion of an overlapping portion (in an example of this embodiment, the current collector 5 and the clip member 50 in a state where the clip member 50 clamps the non-coated layered portion 261) is pressed into a recessed portion 82 of a die (female die) 81 by a punch (male die) 80. With such pressing, a pressed portion is locally bent so as to form an interlocking portion (diameter enlarged portion) on a member disposed inside and hence, the current collector 5 and the clip member 50 are joined to each other (by compression bonding). In this embodiment, the current collector 5 and the clip member 50 are joined to each other by TOX (registered trademark) joining which is a kind of mechanical clinching. In such mechanical clinching, a cross section of an opening portion

601 of a formed recessed portion (joint structure portion 600) has a bent shape. That is, the opening portion 601 and a portion around the opening portion 601 form a bent portion 602 where the layered electrodes 23, 24 and the current collector 5 (to be more specific, the joint piece 55) are bent in a cross-sectional shape. In this embodiment, a portion which is plastically deformed by mechanical clinching as described above is also referred to as a second joint portion 605 (to be more specific, a portion which is plastically deformed between the punch 80 and the die 81 in FIG. 13).

Subsequently, the current collector 5 and the clip member 50 in a state where the second joint portion 605 is formed are joined to each other by resistance welding (step S4). In this resistance welding, one electrode (an electrode used in resistance welding) is brought into contact with the distal end surface 612 and the other electrode (an electrode used in resistance welding) is brought into contact with the bottom surface 652. A contact area (a size in the Y-Z plane direction) of one electrode with the distal end surface 612 is set equal to or smaller than a contact area of the other electrode with the bottom surface 652.

Figure 14:
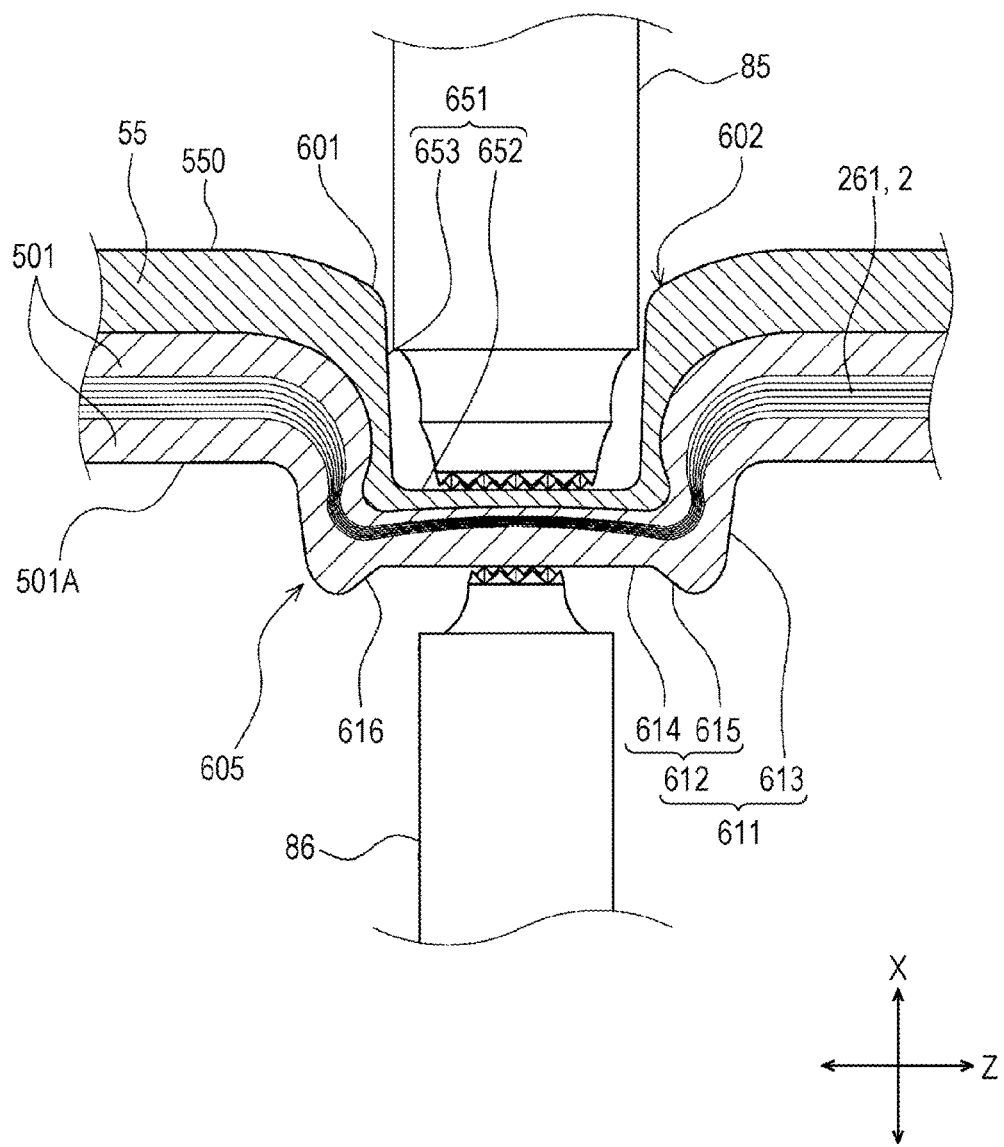
FIG. 14 is a view for describing joining between the electrode assembly and the current collector by ultrasonic bonding.
Figure 15:
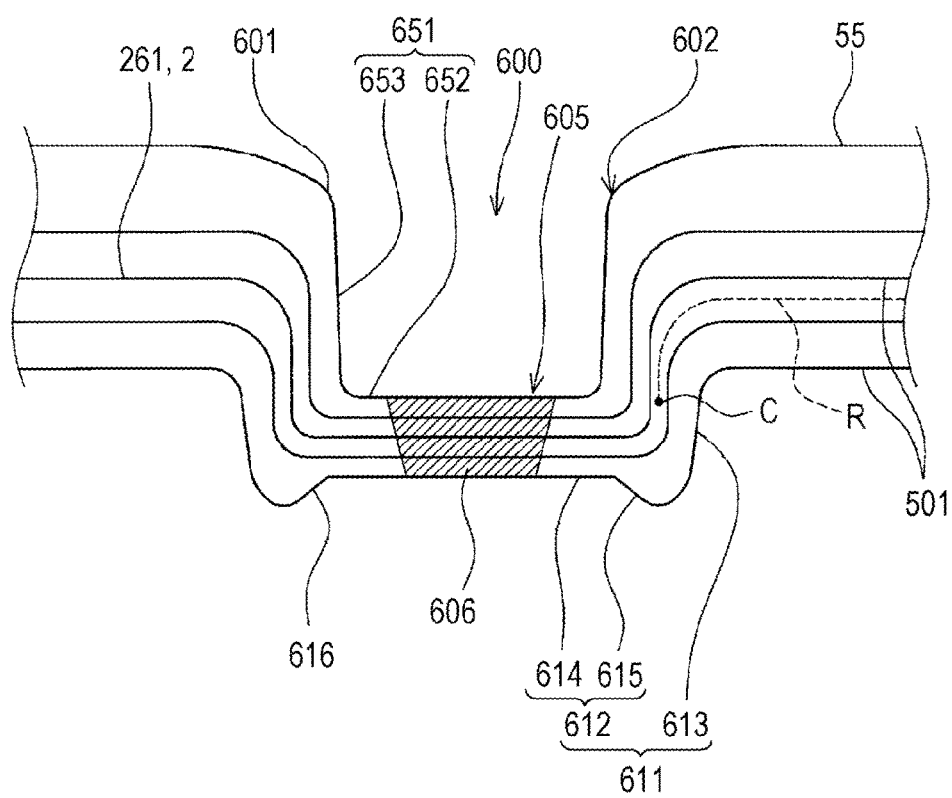
FIG. 15 is a view for describing that when metal powder or the like is present around a second joint portion, the movement of the metal powder or the like to the outside is prevented by a bent portion.

The second joint portion 605 is not necessarily formed by resistance welding. The second joint portion 605 may be formed by laser welding or ultrasonic bonding (compression bonding). For example, in forming the second joint portion 605 by ultrasonic bonding, as shown in FIG. 14, a portion of the second joint portion 605 (the center portion 614 of the distal end surface 612 of the projecting portion 611 and the bottom surface 652 of the recessed portion 651) is sandwiched by a horn (second jig) 85 and an anvil (first jig) 86, and the horn 85 is ultrasonically vibrated. In an example shown in FIG. 14, the horn 85 and the anvil 86 are disposed such that the horn 85 is brought into contact with the bottom surface 652, and the anvil 86 is brought into contact with the distal end surface 612 (to be more specific, center portion 614). That is, the wall surface 616 and the annular projecting portion 615 are devoid of a weldment and ultrasonic bonding. In the example shown in FIG. 14, a contact area (a size in the Y-Z plane direction) between the anvil 86 and the distal end surface 612 is set equal to or smaller than a contact area between the horn 85 and the bottom surface 652 (in the example shown in FIG. 14, the contact area between the anvil 86 and the distal end surface 612 is set smaller than the contact area between the horn 85 and the bottom surface 652).

By performing resistance welding, the positive electrodes 23 or the negative electrodes 24 layered to each other at the divided non-coated layered portion 261 (to be more specific, the non-coated portions 231 or the non-coated portions 241) are firmly joined to each other. The divided non-coated layered portion 261 and the clip member 50 are firmly joined to each other. Further, the clip member 50 and the joint piece 55 are firmly joined to each other. In this embodiment, a portion of the second joint portion 605 (a portion where the current collector 5 and the clip member 50 are joined to each other by mechanical clinching) to which resistance welding is further applied is referred to as a first joint portion 606 (a portion indicated by a mesh in FIG. 10).

After the electrode assembly 2, the external terminals 4, the current collectors 5 and the like are assembled to the lid plate 32 as described above (see FIG. 9), the electrode assembly 2, the current collectors 5 and the like are covered by the insulating member 7 (step S5), and the electrode assembly 2, the current collectors 5 and the like which are covered by the insulating member 7 are inserted into the case body 31 (step S6). With such an operation, the opening of the case body 31 is closed by the lid plate 32 to which the electrode assembly 2, the current collectors 5 and the like are assembled. Then, in a state where a peripheral edge portion of the lid plate 32 is made to overlap with the opening peripheral edge portion 34 of the case body 31, the peripheral edge portion and the opening peripheral edge portion 34 are welded to each other (by laser welding in an example of this embodiment) (step S7). Subsequently, an electrolyte solution is filled into (fed to) the case 3 through the solution filling hole 320 formed in the lid plate 32 (step S8). Thereafter, the solution filling hole 320 is sealed by the solution filling plug 321. With such operations, the manufacture of the energy storage device 1 is completed.

The energy storage device 1 having the above-mentioned configuration includes, on both sides of the first joint portion 606, the inner peripheral surfaces (wall surfaces) 616, 653 which project from the periphery of the first joint portion 606 or a region adjacent to the periphery along the stacking direction, and surrounds the first joint portion 606. Accordingly, due to the formation of the inner peripheral surfaces 616, 653 (to be more specific, the portions which include the inner peripheral surfaces 616, 653), other members (members which face the joint portion or the like) are minimally brought into contact with the surface of the joint portion between the electrode 23, 24 and the current collector 5 (to be more specific, first joint portion 606). With such a configuration, even when fine metal powder or the like generated due to joining (mechanical clinching, resistance welding or the like) is adhered to a surface of the first joint portion 606 (to be more specific, either one of a surface on a hollow portion 27 side or a surface on the side opposite to the hollow portion 27), the metal powder or the like is minimally removed from the surface of the first joint portion 606.

The joint structure portion 600 of the energy storage device 1 of this embodiment has the second joint portion (joint portion) 605 in a region which includes the first joint portion (joint region) 606. That is, in the joint structure portion 600, the first joint portion 606 is formed within the portion where the second joint portion 605 is formed. In this manner, the first joint portion 606 and the second joint portion 605 are formed in an overlapping manner with each other and hence, joining between the electrode 23, 24 and the current collector 5 at the portion is further strengthened. Accordingly, the increase of resistance at the joint structure portion 600 (first joint portion 606), peeling off of members and the like can be suppressed with more certainty.

The energy storage device 1 of this embodiment has, outside the first joint portion 606, the bent portion 602 where the layered electrodes 23, 24 and the current collector 5 are bent in cross section in a direction from the inside to the outside of the first joint portion 606. In the energy storage device 1, even when metal powder or the like (fine metal powder or the like generated due to joining) is present between the layered electrodes 23, 24, between the electrode 23, 24 and the current collector 5 or the like in the periphery of the first joint portion 606 (between the first joint portion 606 and the bent portion 602) (see symbol C in FIG. 15, for example), a path which communicates with the outside (see a broken line indicated by symbol R in FIG. 15, for example) is bent outside the position where the metal powder or the like is present as described above. Accordingly, in the energy storage device 1, it is possible to prevent the discharge of the metal powder or the like from between the electrodes 23, 24, from between the electrode 23, 24 and the current collector 5 or the like to the outside.

In the energy storage device 1 of this embodiment, the bent portion 602 surrounds the first joint portion 606.

Accordingly, in the energy storage device 1, the discharge of metal powder or the like to the outside from between the electrodes 23, 24 and from between the electrode 23, 24 and the current collector 5 can be prevented more effectively.

In the energy storage device 1 of this embodiment, the bent portion 602 includes the inner peripheral surface 653 on a surface thereof. As described above, in the energy storage device 1, the bent portion 602 and the inner peripheral surface 653 are disposed at the same position and hence, compared to a case where the bent portion 602 and the inner peripheral surface 653 are disposed at different positions, the energy storage device 1 can be downsized.

In the method of manufacturing the energy storage device 1 of this embodiment, even when metal powder or the like (metal powder or the like generated due to joining) is likely to scatter from the surface of a welded portion at the time of performing resistance welding, such scattering of metal powder or the like is suppressed by the inner peripheral surface 653 or the inner peripheral surface 616 of the annular projecting portion 615 of the distal end surface 612 which are formed by mechanical clinching (compression bonding). According to the method of manufacturing the energy storage device 1 of this embodiment, the adhesion of metal powder or the like to other members or the like due to such scattering can be effectively prevented.

In the method of manufacturing the energy storage device 1 of this embodiment, mechanical clinching is performed in forming the joint structure portion 600. Accordingly, at the time of pressing a portion where the current collector 5 and the layered electrodes 23, 24 are joined to each other (a portion to which mechanical clinching is applied) into the recessed portion 82 of the die 81 by the punch 80, the bent portion 602, the inner peripheral surface (wall surface) 653, and the annular projecting portion 615 (inner peripheral surface 616) of the distal end surface 612 are formed simultaneously.

In the method of manufacturing the energy storage device 1 of this embodiment, a contact area between one electrode (first jig) for resistance welding and the distal end surface 612 is set smaller than a contact area between the other electrode (second jig) for resistance welding and the bottom surface 652. In this manner, by setting an area of a distal end surface of one electrode equal to or smaller than an area of a distal end surface of the other electrode which is inserted into the recessed portion 651 and is brought into contact with the bottom surface 652, when the second joint portion 605 is clamped by the one electrode and the other electrode so as to form the first joint portion 606, the annular projecting portion 615 is not collapsed by the anvil 86.

In the energy storage device 1 of this embodiment, a height (a size in the Z axis direction in FIG. 10) of the inner peripheral surface 616 of the annular projecting portion 615 from the center portion 614 is smaller than a height (a size in the Z axis direction in FIG. 10) of the inner peripheral surface 653 of the recessed portion 651 from the bottom surface 652. Accordingly, in the method of manufacturing the energy storage device 1 of this embodiment, at the time of performing resistance welding, a contact area of the electrode which is brought into contact with the distal end surface 612 of the projecting portion 611 is set equal to or smaller than a contact area of the electrode which is brought into contact with the bottom surface 652 of the recessed portion 651. Due to such setting of the contact areas, at the time of performing welding, an amount of scattering material such as molten metal generated on the distal end surface 612 side can be made approximately equal to or smaller than an amount of scattering material such as molten metal generated on the bottom surface 652 side. Further, a distance from a peripheral edge of a welding portion on the distal end surface 612 (a portion of the distal end surface 612 which is brought into contact with the electrode for performing resistance welding) to the inner peripheral surface 616 of the annular projecting portion 615 is set equal to or smaller than a distance from a peripheral edge of a welding portion on the bottom surface 652 (a portion of the bottom surface 652 which is brought into contact with the electrode for performing resistance welding) to the inner peripheral surface 653 of the recessed portion 651. Accordingly, a speed of the scattering material such as molten metal which impinges on the inner peripheral surface 616 of the annular projecting portion 615 can be suppressed (made small) compared to a speed of the scattering material which impinges on the inner peripheral surface 653 of the recessed portion 651. With such configurations, in the method of manufacturing the energy storage device 1 of this embodiment, scattering of molten metal or the like to the periphery of the welding portion can be preferably prevented also by the inner peripheral surface 616 of the annular projecting portion 615 having a small height.

Figure 16:
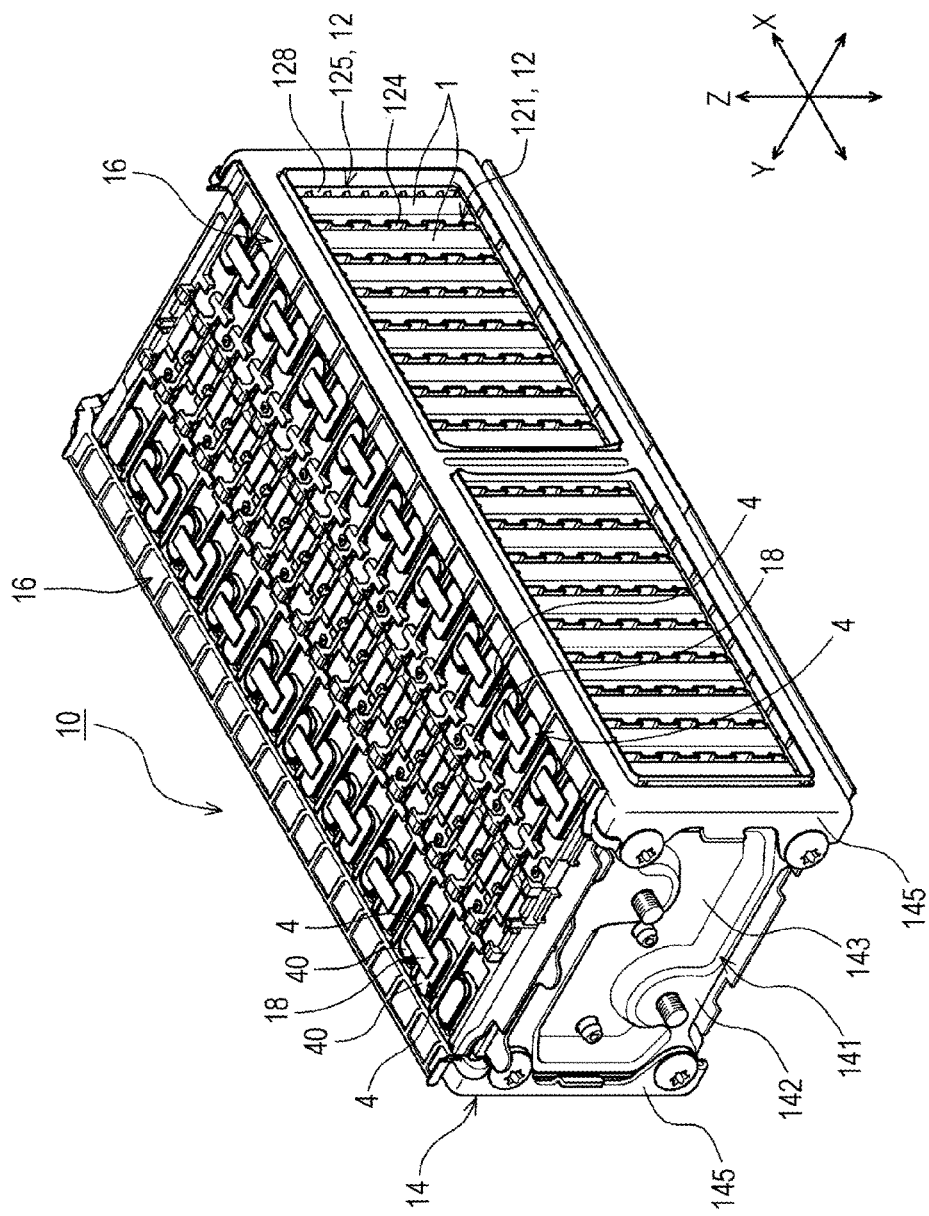
FIG. 16 is a perspective view of an energy storage apparatus of the embodiment.
Figure 17:
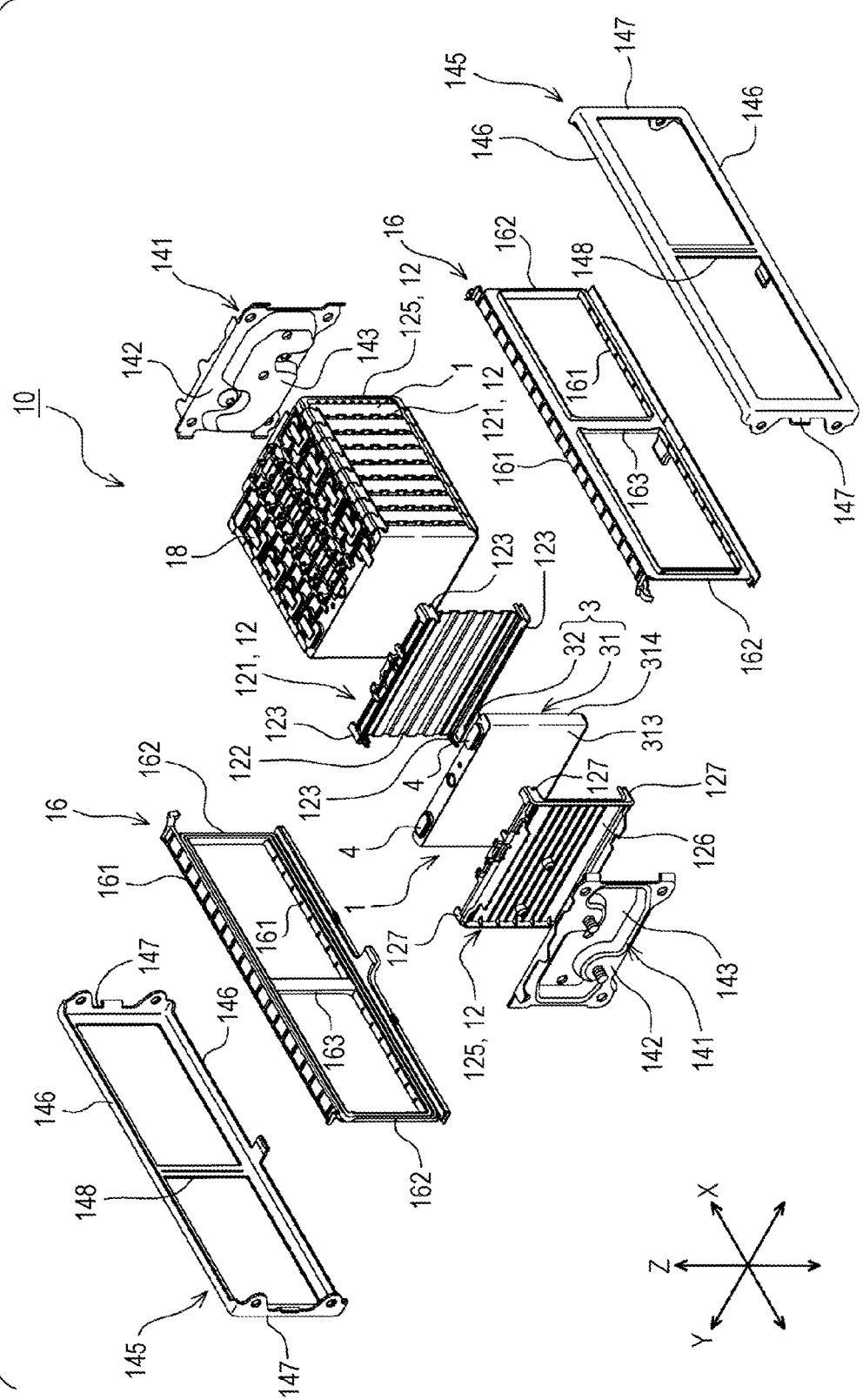
FIG. 17 is an exploded perspective view of the energy storage apparatus where some parts are not shown in the drawing.

Next, an embodiment of an energy storage apparatus which includes the energy storage devices 1 is described with reference to FIG. 16 and FIG. 17. The energy storage apparatus 10 includes a plurality of energy storage devices, and at least one of the plurality of energy storage devices is formed of the above-mentioned energy storage device 1. In the energy storage apparatus 10 of this embodiment, all of the plurality of energy storage devices are formed of the above-mentioned energy storage device 1.

The energy storage apparatus 10 includes: the plurality of energy storage devices 1 which are arranged in a row in the X axis direction; a plurality of adjacent members 12 each of which is disposed adjacently to the energy storage device 1; a holder 14 which holds the plurality of energy storage devices 1 and the plurality of adjacent members 12; insulators 16 which are disposed between the plurality of energy storage devices 1 and the holder 14; and bus bars 18 each of which is connected to external terminals 4 of the energy storage devices 1.

Each adjacent member 12 is disposed between two energy storage devices 1 disposed adjacently to each other in the X axis direction or between the energy storage device 1 and a member disposed adjacently to the energy storage device 1 in the X axis direction (a portion of the holder 14 in an example of this embodiment). The adjacent members 12 include plural kinds of adjacent members. In this embodiment, the adjacent members 12 include: first adjacent members 121 each of which is disposed adjacently to the energy storage device 1 disposed at an intermediate position of the energy storage apparatus 10 in the X axis direction; and second adjacent members 125 each of which is disposed adjacently to an outermost energy storage device 1 of the plurality of energy storage devices 1 arranged in a row in the X axis direction.

Each first adjacent member 121 is disposed between two energy storage devices 1 disposed adjacently to each other in the X axis direction. With such a configuration, a predetermined distance (creepage distance or the like) is ensured between two energy storage devices 1 disposed adjacently to each other in the X axis direction with the first adjacent member 121 interposed therebetween. To be more specific, the first adjacent member 121 has: a first body portion 122 which is disposed adjacently to the energy storage devices 1 (case bodies 31); and first restricting portions 123 which restrict the movement of the energy storage devices 1 disposed adjacently to the first body portion 122 with respect to the first body portion 122.

The first body portion 122 has a rectangular profile which corresponds to the energy storage device 1 (case 3) as viewed in the X axis direction. The first body portion 122 forms flow channels 124 which allow a temperature adjusting fluid (air in an example of this embodiment) to pass therethrough in cooperation with the energy storage device 1 disposed adjacently to the first body portion 122 in the X axis direction.

The first restricting portions 123 extend in the X axis direction from the first body portion 122, and are brought into contact with the energy storage devices 1 (to be more specific, the cases 3) disposed adjacently to the first body portion 122 from the outside in the Y-Z plane (a plane including the Y axis and the Z axis) direction thus restricting the relative movement of the energy storage devices 1 in the Y-Z plane direction with respect to the first body portion 122. The first restricting portion 123 extends in the X axis direction from at least respective corner portions of the first body portion 122.

In this embodiment, the first restricting portion 123 is disposed on one side and the other side of the first body portion 122 in the X axis direction respectively.

Each second adjacent member 125 is disposed between the energy storage device 1 and the holder 14 in the X axis direction. With such a configuration, a predetermined distance (a creepage distance or the like) is ensured between the energy storage device 1 and the holder 14 which are disposed adjacently to each other in the X axis direction with the second adjacent member 125 interposed therebetween. To be more specific, the second adjacent member 125 has: a second body portion 126 which is disposed adjacently to the energy storage device 1 (case body 31) between the energy storage device 1 and the holder 14; and second restricting portions 127 which restrict the movement of the energy storage device 1 disposed adjacently to the second body portion 126 with respect to the second body portion 126.

The second body portion 126 has a rectangular profile which corresponds to the energy storage device 1 (case 3) as viewed in the X axis direction. The second body portion 126 forms flow channels 128 which allow a temperature adjusting fluid (air in an example of this embodiment) to pass therethrough in cooperation with the energy storage device 1 disposed adjacently to the second body portion 126 in the X axis direction.

The second restricting portions 127 extend in the X axis direction from the second body portion 126, and are brought into contact with the energy storage device 1 (to be more specific, the case 3) disposed adjacently to the second body portion 126 from the outside in the Y-Z plane direction thus restricting the relative movement of the energy storage device 1 in the Y-Z plane direction with respect to the second body portion 126. The second restricting portion 127 extends in the X axis direction from at least respective corner portions of the second body portion 126.

The holder 14 surrounds the periphery of the plurality of energy storage devices 1 and the plurality of adjacent members 12 (the first adjacent members 121 and the second adjacent members 125 in the example of this embodiment) thus collectively holding the plurality of energy storage devices 1 and the plurality of adjacent members 12. The holder 14 is made of a material having conductivity. To be more specific, the holder 14 includes: a pair of end members 141 disposed such that the plurality of energy storage devices 1 are positioned between the pair of end members 141 in the X axis direction; and facing members 145 which connect the pair of end members 141 to each other in a state where the facing members 145 face the plurality of energy storage devices 1 in the Y axis direction. In the energy storage apparatus 10 of this embodiment, the pair of end members 141 is disposed in a state where each of the pair of end members 141 sandwiches the second adjacent member 125 in cooperation with the energy storage device 1 disposed on an end of a unit formed of the plurality of energy storage devices 1 in the X axis direction, and the pair of facing members 145 is disposed on both sides in the Y axis direction of the unit formed of the plurality of energy storage devices 1 which are arranged in a row in the X axis direction.

Each of the pair of end members 141 expands in the Y-Z plane direction. To be more specific, each of the pair of end members 141 includes: a body 142 having a profile (a rectangular profile in this embodiment) which corresponds to the energy storage device 1; and a pressure contact portion 143 which projects toward the second body portion 126 of the second adjacent member 125 from the body 142 and is brought into contact with the second adjacent member 125.

Each of the pair of facing members 145 includes: a pair of beam portions 146 which extends in the X axis direction and is disposed in a spaced-apart manner in the Z axis direction; a pair of first connecting portions 147 which connects end portions of the pair of beam portions 146 to each other; and a second connecting portion 148 which connects the pair of beam portions 146 to each other at an intermediate position in the X axis direction.

The insulators 16 have an insulating property. Each insulator 16 is disposed at least between the facing member 145 and the plurality of energy storage devices 1 arranged in a row in the X axis direction. To be more specific, the insulator 16 covers at least regions of the holder 14 which faces the plurality of energy storage devices 1. To be more specific, each insulator 16 includes: first insulating portions 161 which are disposed between the beam portions 146 and the plurality of energy storage devices 1 arranged in a row in the X axis direction; second insulating portions 162 which are disposed between the first connecting portions 147 and the end members 141; and a third insulating portion 163 which is disposed between the second connecting portion 148 and the energy storage device 1.

Each bus bar 18 is formed of a plate-like member having conductivity such as a metal member. The energy storage apparatus 10 of this embodiment includes the plurality of bus bars 18. The plurality of bus bars 18 connect all of the plurality of energy storage devices 1 included in the energy storage apparatus 10 in series (or make all of the plurality of energy storage devices 1 conductive to each other). To be more specific, each of the plurality of bus bars 18 makes the external terminals 4 of the energy storage devices 1 disposed adjacently to each other with the first adjacent member 121 interposed therebetween conductive to each other. In this embodiment, each bus bar 18 is welded to surfaces 40 of the external terminals 4.

According to the energy storage apparatus 10 having the above-mentioned configuration, each energy storage device 1 includes, on both sides of the first joint portion 606, the inner peripheral surfaces (wall surfaces) 616, 653 which project from the periphery of the first joint portion 606 or the region adjacent to the periphery along the stacking direction and surround the first joint portion 606. Due to the formation of the inner peripheral surfaces 616, 653 (to be more specific, portions including the inner peripheral surfaces 616, 653), other members (members which face the joint portion or the like) are minimally brought into contact with a surface of the joint portion between the electrode 23, 24 and the current collector 5 (to be more specific, the first joint portion 606). Accordingly, even when metal powder or the like generated due to joining (mechanical clinching, resistance welding or the like) is adhered to the surface of the first joint portion 606 (to be more specific, either one of the surface on the hollow portion 27 side or the surface on the side opposite to the hollow portion 27), the metal powder or the like is minimally removed from the surface of the first joint portion 606.

It is needless to say that the energy storage device, the energy storage apparatus which includes the energy storage devices, and the method of manufacturing an energy storage device of the present invention are not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be eliminated.

In the energy storage device 1 of the above-mentioned embodiment, the first joint portion 606 is formed by resistance welding. However, the present invention is not limited to such a configuration. As described previously, the first joint portion 606 may be formed by laser welding, ultrasonic bonding or the like.

When the first joint portion 606 is formed by ultrasonic bonding, as shown in FIG. 14, a contact area between the anvil (first jig) 86 and the distal end surface 612 is set smaller than a contact area between the horn (second jig) 85 and the bottom surface 652. By setting a distal end surface of the anvil 86 equal to or smaller than a distal end surface of the horn 85 which is inserted into the recessed portion 651 and is brought into contact with the bottom surface 652 in this manner, when the second joint portion 605 is clamped by the anvil 86 and the horn 85 so as to form the first joint portion 606, the annular projecting portion 615 is not collapsed by the anvil 86.

In the joint structure portion 600 of the above-mentioned embodiment, the inner peripheral surfaces (wall surfaces) 616, 653 project from the periphery of the first joint portion 606 or the region adjacent to the periphery to one side (a side opposite to a direction along which the recessed portion 651 is recessed: a right side in FIG. 10) and the other side (a projecting direction of the projecting portion 611: a left side in FIG. 10) respectively. However, the present invention is not limited to such a configuration. The inner peripheral surfaces 616, 653 may project only to one side or only to the other side.

It is preferable that the inner peripheral surface 653 of the recessed portion 651 be formed on a side to which energy is supplied so as to perform welding or the like on a portion (a portion where the first joint portion 606 is formed) at the time of forming the first joint portion 606. The side to which energy is supplied is a side where a spark or the like is generated when energy is supplied and to which metal powder or the like (metal powder or the like generated due to joining) generated due to cooling of such a spark is liable to adhere. For example, when the first joint portion 606 is formed by ultrasonic bonding, the side to which energy is supplied is a side where the horn 85 is disposed. When the first joint portion 606 is formed by laser welding, the side to which energy is supplied is a side to which a laser beam is irradiated. When the first joint portion 606 is formed by resistance welding, the side to which energy is supplied is a side to which an electric current is supplied.

Assume a case where the first joint portion 606 is formed by laser welding or resistance welding. In such a case, due to the formation of the inner peripheral surface 653, at the time of performing welding, it is possible to prevent sputter (spark or the like) generated on the bottom surface 652 of the recessed portion 651 and a periphery of the bottom surface 652 from scattering to the surrounding.

Assume a case where the first joint portion 606 is formed by laser welding. In such a case, due to the formation of the inner peripheral surface 653, even when a laser beam irradiated to the inside of the recessed portion 651 is partially reflected, the periphery around a portion to which a laser beam is irradiated (a portion where the first joint portion 606 is formed) is surrounded by the inner peripheral surface 653 and hence, the reflected laser beam is confined in the recessed portion 651 (or minimally leaked to the outside from the recessed portion 651). Accordingly, a damage to other portions caused by the reflected laser beam can be also prevented.

In the energy storage device 1 of the above-mentioned embodiment, the distal end surface 612 of the joint structure portion 600 projects toward the hollow portion 27 side of the electrode assembly 2. However, the present invention is not limited to such a configuration. The distal end surface 612 of the joint structure portion 600 may project to a side opposite to the hollow portion 27 (toward the long wall portion 313 of the case 3).

In the energy storage device 1 of the above-mentioned embodiment, the inner peripheral surfaces 616, 653 (to be more specific, the wall surfaces which project from the periphery of the first joint portion 606 between the electrode 23, 24 and the current collector 5 or a region adjacent to the periphery along the stacking direction of the electrode 23, 24 and the current collector 5, and surround the first joint portion 606: the inner peripheral surface 653 of the recessed portion 651 and the inner peripheral surface 616 of the annular projecting portion 615 of the distal end surface 612 in the example of the above-mentioned embodiment) extend (are raised) in the direction approximately orthogonal to the surface of the first joint portion 606. However, the present invention is not limited to such a configuration. It is sufficient that the wall surfaces extend (be raised) in a direction which intersects with the surface of the first joint portion 606.

Figure 18:
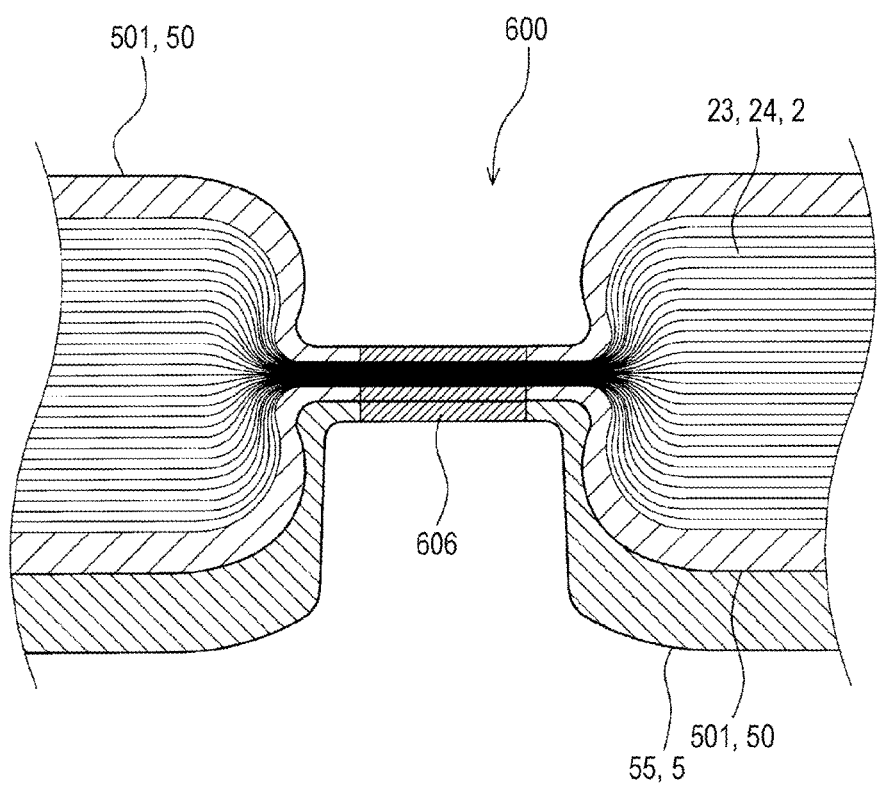
FIG. 18 is a cross-sectional view of a joint structure portion according to another embodiment.
Figure 19:
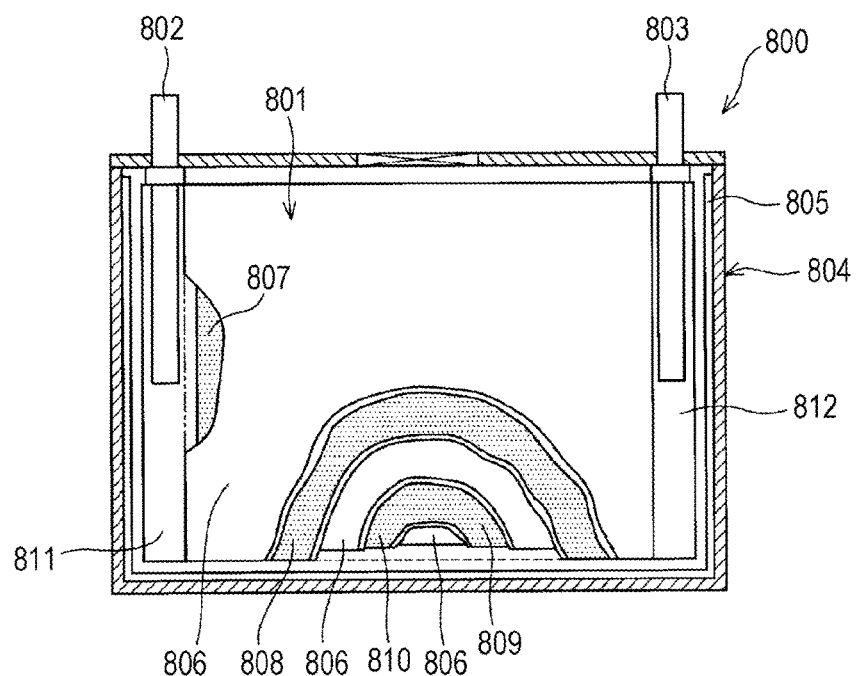
FIG. 19 is a cross-sectional view of a conventional lithium ion secondary battery.

In the energy storage device 1 of the above-mentioned embodiment, the joint structure portion 600 has a bottomed cylindrical shape which projects to one side (toward the hollow portion 27 side of the electrode assembly 2 in the example of the above-mentioned embodiment). However, the present invention is not limited to such a configuration. For example, as shown in FIG. 18, the joint structure portion 600 may be recessed from both sides in the stacking direction of the electrode 23, 24 and the current collector 5.

In the energy storage device 1 of the above-mentioned embodiment, the electrode 23, 24 and the current collector 5 are joined to each other in a state where the clip members 50 are disposed between the electrode 23, 24 (electrode assembly 2) and the current collector 5. However, the present invention is not limited to such a configuration. The electrode 23, 24 and the current collector 5 may be joined to each other (that is, the joint structure portion 600 may be formed) in a state where the electrode 23, 24 and the current collector 5 are directly brought into contact with each other. Alternatively, the electrode 23, 24 and the current collector 5 may be joined to each other in a state where another conductive member is interposed between the electrode 23, 24 and the current collector 5.

In the energy storage device 1 of the above-mentioned embodiment, one bent portion 602 is formed in cross section in a direction from the inside to the outside of the first joint portion 606. However, a plurality of bent portions 602 may be formed.

The electrode assembly 2 of the energy storage device 1 of the above-mentioned embodiment is a so-called winding type electrode assembly formed by winding the electrodes 23, 24. However, the electrode assembly 2 may be a so-called layered-type electrode assembly where sheet-like electrodes 23, 24 are layered to each other.

In the above-mentioned embodiment, the description has been made with respect to the case where the energy storage device is the chargeable/dischargeable nonaqueous electrolyte secondary battery (for example, lithium ion secondary battery). However, a type and a size (capacity) of an energy storage device can be desirably selected. In the above-mentioned embodiment, the description has been made with respect to the lithium ion secondary battery as one example of the energy storage device. However, the present invention is not limited to the lithium ion secondary battery. For example, the present invention is also applicable to various secondary batteries, primary batteries, and energy storage devices of capacitors such as electric double layer capacitors.

What is claimed is:

1. An energy storage device comprising:
    an electrode assembly comprising electrodes that are layered to each other; and
    a current collector joined to an electrode of the layered electrodes in a state where the current collector overlaps with the electrode,
    wherein the electrode and the current collector are welded to each other or are jointed to each other by ultrasonic bonding at a first joint portion,
    the electrode and the current collector include a second joint portion which includes the first joint portion, the second joint portion joining the electrode and the current collector to each other and forming:
        a projecting portion on one side thereof in an overlapping direction of the electrode and the current collector; and
        a recessed portion on an other side thereof in the overlapping direction,
    the projecting portion includes a wall surface which projects, along the overlapping direction, from a periphery of the first joint portion or a region adjacent to the periphery, the wall surface surrounding the first joint portion, and
    a size of the first joint portion on the one side is set equal to or smaller than a size of the first joint portion on the other side.

2. The energy storage device according to claim 1, wherein the first joint portion is continuously formed from the one side to the other side, the one side includes an annular projecting portion which surrounds the first joint portion,
    an inner peripheral surface of the annular projecting portion forms the wall surface on one side of the first joint portion in the overlapping direction, and
    an inner peripheral surface of the recessed portion forms the wall surface on an other side of the first joint portion in the overlapping direction.

3. An energy storage apparatus comprising at least one energy storage device according to claim 1.

4. The energy storage device according to claim 1, wherein the first joint portion is formed by welding.

5. The energy storage device according to claim 1, wherein the first joint portion is formed by welding and the second joint portion is formed by mechanical clinching.

6. An energy storage device comprising:
    an electrode assembly comprising electrodes that are layered to each other; and
    a current collector joined to an electrode of the layered electrodes in a state where the current collector overlaps with the electrode,
    wherein the electrode and the current collector are welded to each other or are jointed to each other by ultrasonic bonding at a first joint portion,
    the electrode and the current collector include a second joint portion which includes the first joint portion, the second joint portion joining the electrode and the current collector to each other and forming:
        a projecting portion on one side thereof in an overlapping direction of the electrode and the current collector; and
        a recessed portion on an other side thereof in the overlapping direction,
    the projecting portion includes a wall surface which projects, along the overlapping direction, from a periphery of the first joint portion or a region adjacent to the periphery, the wall surface surrounding the first joint portion, and
    wherein the first joint portion is continuously formed from the one side to the other side.

7. The energy storage device according to claim 1, wherein the current collector comprises:
    first and second connecting portions;
    a bent portion connecting the first and second connecting portions; and
    a joint piece which extends from the second connecting portion and is joined to the electrode.

8. The energy storage device according to claim 7, wherein the recessed portion comprises an opening portion and a bent portion formed around the opening portion, and
    wherein the electrode and the joint piece are bent at the bent portion in a cross-sectional direction.

9. The energy storage device according to claim 7, further comprising:
    a case which houses the electrode assembly and the current collector, the case comprising a case body and a lid plate formed on an opening of the case body, the first connecting portion of the current collector extending along an inner surface of the lid plate; and
    an external terminal formed on an outer surface of the lid plate and connected to the first connecting portion of the current collector.

10. The energy storage device according to claim 7, further comprising:
    a clip member comprising:
        first and second facing pieces which are formed on opposing sides of the electrode; and
        a connecting portion which connects the first and second facing pieces.

11. The energy storage device according to claim 10, wherein the joint piece of the current collector is welded to one of the first and second facing pieces in the second joint portion.

12. The energy storage device according to claim 10, wherein the recessed portion is recessed in a direction toward the clip member on a surface of the joint piece.

13. The energy storage device according to claim 10, wherein the projecting portion projects in a direction away from the joint piece on a surface of one of the first and second facing pieces of the clip member at a position which corresponds to the recessed portion.

14. The energy storage device according to claim 10, wherein the electrode comprises first and second divided non-coated layered portions, and
wherein the clip member comprises:
a first clip member which clamps the first divided non-coated layered portion; and
a second clip member which clamps the second divided non-coated layered portion.

15. The energy storage device according to claim 14, wherein the joint piece comprises:
a first joint piece which is welded to one of the first and second facing pieces of the first clip member; and
a second joint piece which is welded to one of the first and second facing pieces of the second clip member.

16. The energy storage device according to claim 15, wherein an opening is formed in a center portion of the second connecting portion and the first and second joint pieces extend from the center portion so as to define the opening.

17. The energy storage device according to claim 6, wherein the first joint portion is continuously formed from the one side to a bottom surface of the recessed portion on the other side.

18. An energy storage device comprising:
an electrode assembly comprising electrodes that are layered to each other; and
a current collector joined to an electrode of the layered electrodes in a state where the current collector overlaps with the electrode;
a first joint portion at which the electrode and the current collector are one of welded and bonded together;
a second joint portion at which the electrode and the current collector are mechanically clinched together and in which the first joint portion is formed, the second joint portion comprising:
a projecting portion formed on one side of the second joint portion in an overlapping direction of the electrode and the current collector; and
a recessed portion formed on an other side of the second joint portion in the overlapping direction,
wherein the projecting portion includes a wall surface which projects, along the overlapping direction, from a periphery of the first joint portion or a region adjacent to the periphery, the wall surface surrounding the first joint portion, and
wherein a size of the first joint portion on the one side is set equal to or less than a size of the first joint portion on the other side.

* * * * *